US012172177B2

(12) United States Patent
Theberge et al.

(10) Patent No.: US 12,172,177 B2
(45) Date of Patent: Dec. 24, 2024

(54) NONDESSICATING TARGET CAPTURE DEVICE

(71) Applicant: University of Washington, Seattle, WA (US)

(72) Inventors: Ashleigh Brooks Theberge, Seattle, WA (US); Tammi van Neel, Seattle, WA (US); Jean Berthier, Seattle, WA (US); Erwin Stefan Peter Berthier, Seattle, WA (US); Ulri Nicole Lee, Seattle, WA (US)

(73) Assignee: University of Washington, Seattle, WA (US)

( * ) Notice: Subject to any disclaimer, the term of this patent is extended or adjusted under 35 U.S.C. 154(b) by 592 days.

(21) Appl. No.: 17/476,289

(22) Filed: Sep. 15, 2021

(65) Prior Publication Data

US 2022/0080450 A1 Mar. 17, 2022

Related U.S. Application Data

(60) Provisional application No. 63/079,845, filed on Sep. 17, 2020.

(51) Int. Cl.
*B01L 3/00* (2006.01)
*B05B 17/06* (2006.01)

(52) U.S. Cl.
CPC ........ *B05B 17/06* (2013.01); *B01L 3/502746* (2013.01); *B01L 2200/18* (2013.01); *B01L 2400/086* (2013.01)

(58) Field of Classification Search
CPC ............... B05B 17/06; B01L 3/502746; B01L 2200/18; B01L 2400/086; G01N 1/24;
(Continued)

(56) References Cited

U.S. PATENT DOCUMENTS 5,300,131 A * 4/1994 Richard ................. B01D 47/12
96/300
5,855,652 A * 1/1999 Talley ................. G01N 1/2273
96/228

FOREIGN PATENT DOCUMENTS

CN 207137602 U * 3/2018
WO WO-2021045808 A1 * 3/2021

OTHER PUBLICATIONS

Alonso, et al., "Assessment of air sampling methods and size distribution of virus-laden aerosols in outbreaks in swine and poultry farms," J. Vet. Diagn. Invest., vol. 29, No. 3, 2017, pp. 298-304.
(Continued)

*Primary Examiner* — Eric S. McCall
*Assistant Examiner* — Timothy P Graves
(74) *Attorney, Agent, or Firm* — Katherine M. Mead; Lee & Hayes PC

(57) ABSTRACT

Techniques for efficiently capturing targets, such as biological materials, within the air are described. A lightweight, portable device is configured to capture the targets without desiccation by flowing a mixture of air carrying the targets with liquid droplets through a nonlinear path in a partially enclosed interior of the device. For example, a method includes generating an impinging jet comprising a mixture of air, a target, and droplets. A baffle splits the impinging jet into a recirculation zone and coalesces a mixture of the target and the droplets onto an upper surface of the baffle. At least one channel receives the coalesced mixture and transports the coalesced mixture to a collection reservoir.

20 Claims, 15 Drawing Sheets
(6 of 15 Drawing Sheet(s) Filed in Color)

(58) Field of Classification Search
CPC .. G01N 1/40; G01N 2001/245; G01N 1/2208; G01N 1/2273; G01N 1/2214; G01N 2001/2223
See application file for complete search history.

(56) References Cited

OTHER PUBLICATIONS

Apelberg, et al., "Environmental monitoring of secondhand smoke exposure," Tob. Control., vol. 22, No. 3, 2013, pp. 147-155.
Berthier, et al., "Open Microfluidic Capillary Systems," Anal. Chem., vol. 91, No. 14, 2019, pp. 8739-8750.
Burkart, et al., "Characterizing the performance of two optical particle counters (Grimm OPC1.108 and OPC1.109) under urban aerosol conditions," J. Aerosol Sci., vol. 41, No. 10, 2010, pp. 953-962.
Cai, et al., "Validation of MicroAeth as a Black Carbon Monitor for Fixed-Site Measurement and Optimization for Personal Exposure Characterization," Aerosol Air Qual Res., vol. 14, No. 1, 2014, 9 pages.
Casavant, et al., "Suspended microfluidics," PNAS, vol. 110, No. 25, 2013, pp. 10111-10116.
Chakrabarty, et al., "Trapping and aerogelation of nanoparticles in negative gravity hydrocarbon flames," Applied Physics Letters, vol. 104, No. 24, 2014, 5 pages.
Choi, et al., "Aerosol Sampling in a Hospital Emergency Room Setting: A Complementary Surveillance Method for the Detection of Respiratory Viruses," Front Public Health, vol. 6, No., 174, 2018, 5 pages.
Davis, et al., "Soot morphology and nanostructure in complex flame flow patterns via secondary particle surface growth," Fuel (Lond), vol. 245, 2019, pp. 447-457.
Duncan, et al., "Usability of a Personal Air Pollution Monitor: Design-Feedback Iterative Cycle Study," JMIR Mhealth Uhealth, vol. 6, No. 12, 2018, 9 pages.
Fillingham and Novosselov, "Wall jet similarity of impinging planar underexpanded jets," International Journal of Heat and Fluid Flow, vol. 81, 2020, 21 pages.
Fillingham, et al., "Characterization of adhesion force in aerodynamic particle resuspension," J. Aerosol Science, vol. 128, 2019, pp. 89-98.
Fillingham, et al., "Drag, lift, and torque on a prolate spheroid resting on a smooth surface in a linear shear flow," Powder Technology, vol. 377, 2021, pp. 958-965.
Fillingham, et al., "Nondimensional parameter for characterization of wall shear stress from underexpanded axisymmetric impinging jets," Journal of Fluids Engineering, 2017, vol. 139, No. 11, 2017, 9 pages.
Foat, et al., "A prototype personal aerosol sampler based on electrostatic precipitation and electrowetting-on-dielectric actuation of droplets," J. Aerosol Science, vol. 95, 2016, pp. 43-53.
Gao, et al., "A distributed network of low-cost continuous reading sensors to measure spatiotemporal variations of PM2.5 in Xi'an, China," Environmental Pollution, vol. 199, 2015, pp. 56-65.
Gemci and Ebert, "Prediction of the particle capture efficiency based on the combined mechanisms (turbulent diffusion, inertial impaction, interception, and gravitation) by a 3-D simulation of a wet scrubber," J. Aerosol Science, vol. 23, No. 1, 1992, pp. 769-772.
Gordon, et al., "A simple novel device for air sampling by electrokinetic capture," Microbiome, vol. 3, No. 79, 2015, 8 pages.
Griffiths, et al., "Procedures for the characterisation of bioaerosol particles. Part II: Effects of environment on culturability," Aerobiologia, vol. 17, 2001, pp. 109-119.

Han, et al., "Design and development of a self-contained personal electrostatic bioaerosol sampler (PEBS) with a wire-to-wire charger," Aerosol Science and Technology, vol. 51, No. 8, pp. 903-915.
He & Novosselov, "Design and evaluation of an aerodynamic focusing micro-well aerosol collector," Aerosol Science and Technology, vol. 51, No. 9, 2017, pp. 1016-1026.
He, et al., "Evaluation of micro-well collector for capture and analysis of aerosolized Bacillus subtilis spores," PLoS One., vol. 13, No. 5, 2018, 12 pages.
Kastner & Das, "Wet Scrubber Analysis of Volatile Organic Compound Removal in the Rendering Industry," J. Air Waste Management Assoc., vol. 52, No. 4, 2002, pp. 459-469.
Kesavan, et al., "Evaluation of Bioaerosol Damplers," Environmental Science: Processes & Impacts, vol. 17, No. 3, 2015, pp. 638-645.
Kim, et al., "Particle Removal Efficiency of Gravitational Wet Scrubber Considering Diffusion, Interception, and Impaction," Enviromental Engineering Science, vol. 18, No. 2, 2001, pp. 125-136.
Koehler and Peter, "New Methods for Personal Exposure Monitoring for Airborne Particles," Current Environmental Health Reports, vol. 2, 2015, pp. 399-411.
Lindsley, et al., NIOSH Manual of Analytical Methods, 5th Ed., ed. 2017, 115 pages.
Machado, et al., "Bacteriophages as surrogates for the study of viral dispersion in open air," Arch Microbiol., vol. 203, 2021, pp. 4041-4049.
Manisalidis, et al., "Environmental and Health Impacts of Air Pollution: A Review," Front. Public Health, vol. 8, No. 14, 2020, 13 Pages.
Mischler, et al. ", A Multi-Cyclone Sampling Array for the Collection of Size-Segregated Occupational Aerosols," J. Occup. Environ. Hyg., 2013, vol. 10, No. 12, 2013, pp. 685-693.
Namiesnik, et al., "Passive sampling and/or extraction techniques in environmental analysis: a review," Analystical and Bioanalystical Chemistry, vol. 381, 2004, pp. 279-301.
Novosselov, et al., "Design and Performance of a Low-Cost Micro-Channel Aerosol Collector," Aerosol Science and Technology, vol. 48, No. 8, 2014, pp. 822-830.
Petersen, et al., "Numerical, wind-tunnel, and atmospheric evaluation of a turbulent ground-based inlet sampling system," Aerosol Science and Technology, vol. 53, No. 6., 2019, pp. 712-727.
Pope and Dockery, "Health effects of fine particulate air pollution: lines that connect," J. Air Waste Manag. Assoc., vol. 56, No. 6, 2006, pp. 709-742.
Seto, et al., "Use of low-cost particle monitors to calibrate traffic-related air pollutant models in urban areas," BYU Scholars Archive, 2014, 9 pages.
Smielowska, et al., "Indoor air quality in public utility environments—a review," Environmental Science and Pollution, vol. 24, 2017, pp. 1116-11176.
Srikanth, et al., "Bio-Aerosols in Indoor Environment: Composition, Health Effects and Analysis," Indian Journal of Medical Microbiology, vol. 26, No. 4, 2008, pp. 302-312.
Stockwell, et al., "Indoor hospital air and the impact of ventilation on bioaerosols: a systematic review," J. Hosp. Infect., vol. 103, No. 2, 2019, pp. 175-184.
Thompson, "Airborne Particulate Matter: Human Exposure and Health Effects," J. Occup. Environ. Med., vol. 60, No. 5, 2018, pp. 392-423.
Volckens, et al., "Development and evaluation of an ultrasonic personal aerosol sampler," Inter. J. Indoor Enviro. and Health, vol. 27, No. 2, 2017, pp. 409-416.
Walls, et al., "Generation and sampling of nanoscale infectious viral aerosols," Aerosol Science and Technology, vol. 50, No. 8, 2016, pp. 802-811.
Wang, et al., "Field evaluation of personal sampling methods for multiple bioaerosols," PLoS One, vol. 10, No. 3, 2015, 19 pages.

\* cited by examiner

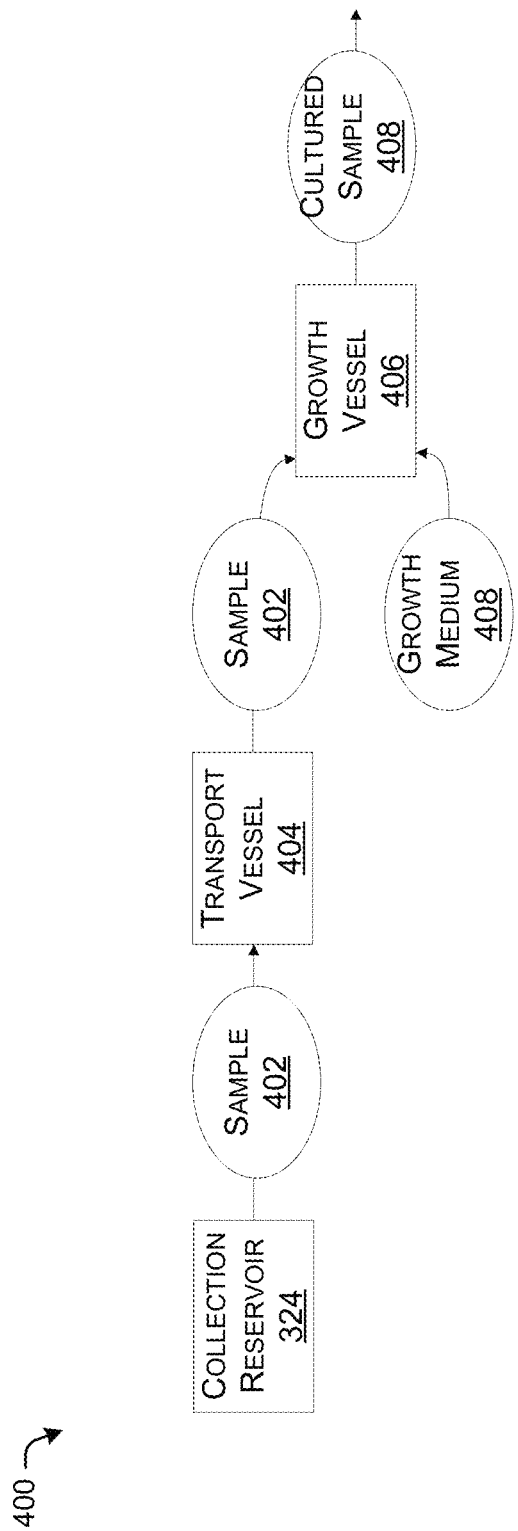

```
                    500 ─┐
                    ┌─────────────────────────────┐
                    │   GENERATE DROPLETS 502     │
                    └──────────────┬──────────────┘
                                   ▼
              ┌──────────────────────────────────────────┐
              │  FLOW A MIXTURE OF DROPLETS, AIR, AND A  │
              │  TARGET THROUGH A BAFFLED INTERIOR SPACE │
              │  504                                     │
              └──────────────────┬───────────────────────┘
                                 ▼
              ┌──────────────────────────────────────────┐
              │ COALESCE THE DROPLETS AND TARGET ON A    │
              │ SURFACE OF A BAFFLE IN THE INTERIOR      │
              │ SPACE 506                                │
              └──────────────────┬───────────────────────┘
                                 ▼
              ┌──────────────────────────────────────────┐
              │  TRANSPORT TARGET AND LIQUID TO A        │
              │  COLLECTION RESERVOIR 508                │
              └──────────────────────────────────────────┘
```

FIG. 5

```
                    600 ─┐
              ┌──────────────────────────────────────────┐
              │ COLLECT TARGET AND LIQUID FROM COLLECTION│
              │ RESERVOIR 602                            │
              └──────────────────┬───────────────────────┘
                                 ▼
              ┌──────────────────────────────────────────┐
              │ ADD A SAMPLE OF THE TARGET AND LIQUID TO │
              │ A GROWTH MEDIUM 604                      │
              └──────────────────┬───────────────────────┘
                                 ▼
              ┌──────────────────────────────────────────┐
              │ CULTURE THE SAMPLE IN THE GROWTH MEDIUM  │
              │ 606                                      │
              └──────────────────┬───────────────────────┘
                                 ▼
              ┌──────────────────────────────────────────┐
              │ CONFIRM THE PRESENCE OF THE TARGET BASED │
              │ ON THE CULTURED SAMPLE 608               │
              └──────────────────────────────────────────┘
```

FIG. 6

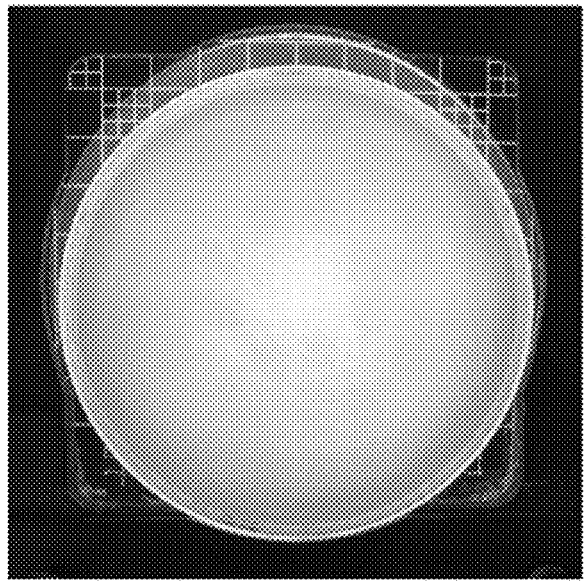
DEVICE SAMPLE WITHOUT MS2 IN CHAMBER
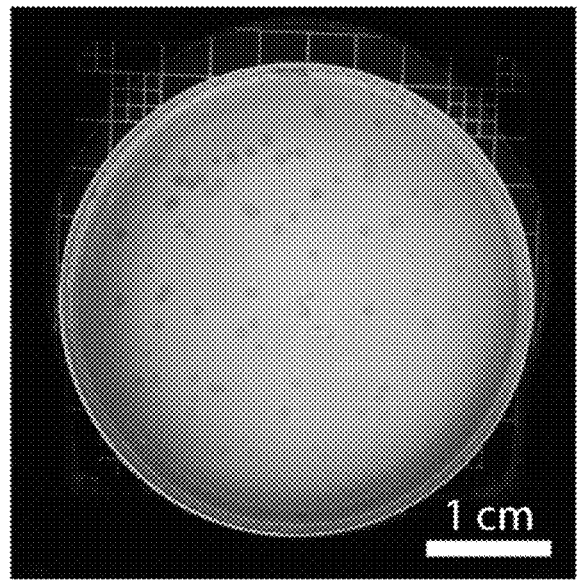
DEVICE SAMPLE WITH MS2 IN CHAMBER
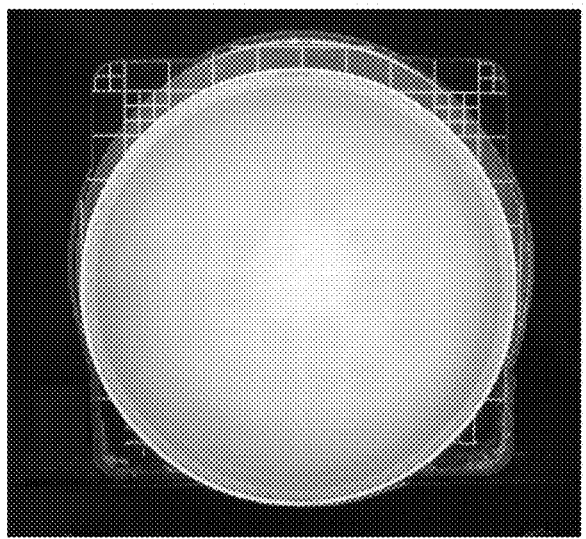
NEGATIVE CONTROL (E. COLI ONLY)
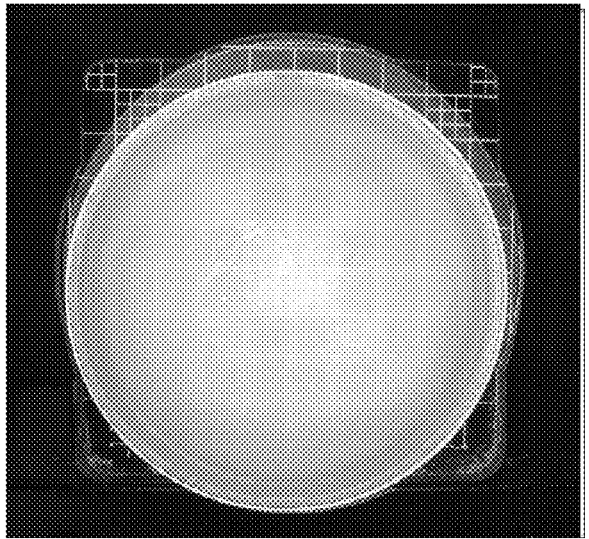
NEGATIVE CONTROL (PBS ONLY, NO DEVICE SAMPLE)
FIG. 11

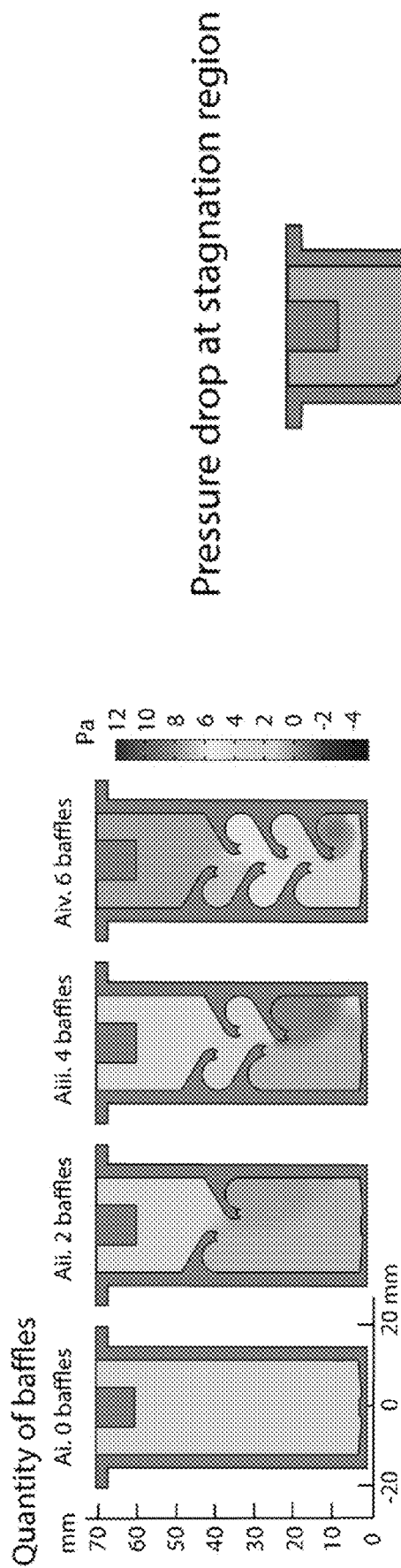
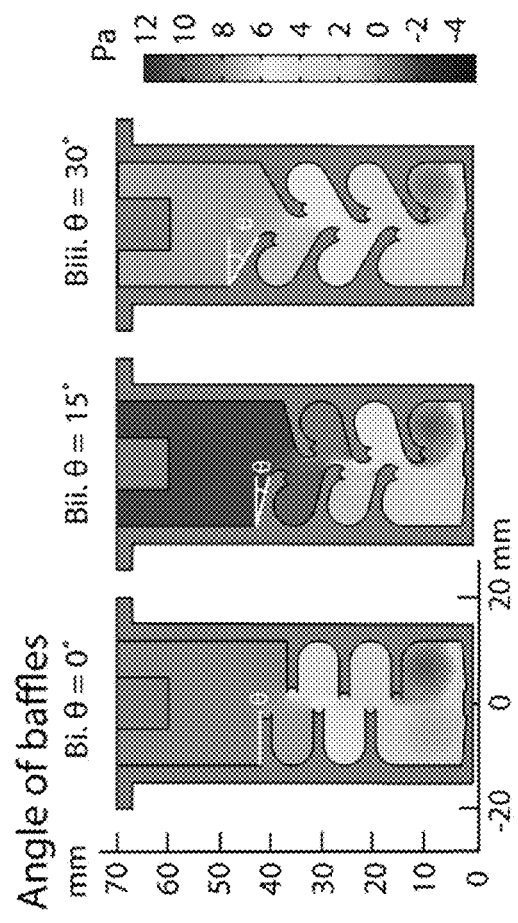
FIG. 13A
FIG. 13B
FIG. 13C

NONDESSICATING TARGET CAPTURE DEVICE

CROSS-REFERENCE TO RELATED APPLICATION

This application claims the priority of U.S. App. No. 63/079,845, which was filed on Sep. 17, 2020 and is incorporated by reference herein in its entirety.

TECHNICAL FIELD

This application relates to methods, systems, and devices for sampling and capturing airborne particles, such as biological materials (e.g., bioaerosols), without desiccating the particles.

BACKGROUND

Environmental pollutants dispersed and transmitted through the air (e.g., particulate matter, bioaerosols, volatile organic compounds) are ubiquitous and often affect human, animal, and plant health. Individuals inhale a variety of aerosols (e.g., dust particles, ultrafine particulate matter (PM), biologically derived aerosols, and potentially infectious bioaerosols) on a daily basis. Ware et al, Am J Epidemiol 1993, 137(12), 1287-1301; Pappas et al., Int J Occup Environ Health 2000, 6(1), 1-8; Thompson et al., J Occup Environ Med 2018, 60(5), 392-423. When aerosols come into contact with the incredibly large surface area of the lungs, they can trigger and exacerbate allergic reactions, cause serious infections, and induce severe toxic reactions, particularly in immunocompromised individuals. Thompson et al., J Occup Environ Med 2018, 60(5), 392-423; Manisalidis et al., Front Public Health 2020, 8, 14; Tovey et al., Am Rev Respir Dis 1981, 124 (5), 630-35. Despite years of research on the effects of aerosols on human health, our understanding of the extent specific types of aerosols can have on the short- and long-term health has focused largely on a number of salient aerosol types (e.g., cigarette smoke, PM2.5 particles) (Apelberg et al., Tob Control 2013, 22(3), 147-155; Pope et al., J Air Waste Manag Assoc 2006, 56(6), 709-42) and environmental settings (e.g., hospitals, farms, etc.) (Choi et al., Front Public Health 2018, 6, 174; Stockwell et al. J Hosp Infect 2019, 103(2), 175-84; Alonso, et al., J Vet Diagn Invest 2017, 29 (3), 298-304; Śmiefowska et al, Environ Sci Pollut Res Int 2017, 24(12), 11166-76). This is in part due to the fluctuating and highly personalized nature of an individual's exposure as the formation, dispersion, and transport of aerosols is influenced by both physical (e.g., size, shape, density, etc., of aerosols) and environmental (e.g., air currents, humidity, temperature, etc.) factors. Wu et al., ACS Photonics 2018, 5(11), 4617-27; Srikanth et al., Indian J Med Microbiol 2008, 26(4), 302-12. Coupled with the limitations in personal sampling and ability to analyze chemical and biological composition of the collected sample, researchers and clinicians are still unable to pinpoint patient-specific triggers for the substantial number of people worldwide affected by environmentally-induced respiratory illnesses.

To date, a variety of devices using passive and active methods (e.g., filters, cyclones, and impactors, etc.) have been developed to provide more information on our everyday exposures to aerosols. These methods are robust in capturing airborne particles but are not intended for measuring particle concentrations in the air. Similarly, methods for counting particles exist but fail to retain the particles in the system for further analysis.

For bioaerosols (e.g., viruses, fungal spores, pollen, etc.), desiccation during sampling is problematic for downstream viability analyses. To date, a variety of passive (e.g., Namieśnik et al., Anal Bioanal Chem 2005, 381(2), 279-301) and active (e.g., Lee et al., ACS Sens 2020, 5(12), 3915-22; Volckens et al., Indoor Air 2017, 27 (2), 409-16) sampling devices have been developed for the collection of bioaerosols, including filter collection, centrifugal collection, electrostatic precipitation, liquid impingement, and impaction and direct collection onto growth media. Viegas et al., Sampling for Microbial Determinations. In Exposure to Microbiological Agents in Indoor and Occupational Environments, 1 ed. 2017; Kesavan et al., Environmental Science: Processes & Impacts 2015, 17(3), 638-45; Wang et al., PLoS One 2015, 10(3), e0120308; Yates et al., in Manual of Environmental Microbiology Fourth Edition ed. 2016; Aizenberg et al., AIHAJ 2000, 61(6), 855-64. Wet scrubbers are air pollution control systems that capture particles and volatile organic compounds (VOCs) in production facilities. These systems have been identified as one of the most effective methods for removing particles larger than 1 micron (μm) from the air. However, wet scrubbers are large (ranging from the size of a small appliance to an industrial smokestack), susceptible to corrosion, and have high energy requirements.

Information on aerosol concentration and size distribution can also be obtained in real-time using aerosol particle counters (Duncan et al., JMIR Mhealth Uhealth 2018, 6(12), e12023; Gao et al., Environ Pollut 2015, 199, 56-65; Seto et al., in Use of low-cost particle monitors to calibrate traffic-related air pollutant models in urban areas, 7th International Environmental Modelling and Software Society 2014), however, these monitors do not collect particles nor retain viable samples for further specific identification and analysis. See Burkart et al., J Aerosol Sci 2010, 41(10), 953-62. With respect to direct personal exposure monitoring, existing aerosol collection methods may not be practical. For example, filter collection and analysis is limited by high elution volumes, bulky setup, and high-power requirements.

Due to the development in miniaturization of sampling pumps and electronics, exposure measurement techniques using biological aerosol collectors (Roux et al., Environmental Science and Pollution Research 2016, 23(9), 8175-83; Han et al., Aerosol Science and Technology 2017, 51(8), 903-15; Foat et al., Journal of Aerosol Science 2016, 95, 43-53; Novosselov et al., Aerosol Science and Technology 2014, 48(8), 822-30; He et al., PLOS ONE 2018, 13(5), e0197783) have rapidly advanced and gained popularity. See, e.g., Koehler et al., Curr Environ Health Rep 2015, 2(4), 399-411; Chartier et al., Indoor Air 2017, 27(1), 147-59; Cai et al., Aerosol Air Qual Res 2014, 14(1), 1-9. However, obtaining biological samples presents unique challenges. For non-spore forming infectious bioaerosols (e.g., viruses and vegetative bacterial cells), desiccation during sampling is problematic for downstream viability analyses and infectivity studies. Wang et al., Journal of Aerosol Science 2001, 32(5), 661-74. Although bulk liquid and hydrated gel components integrated in established sampling devices have been shown to improve viability and culturability (Griffiths et al., Aerobiologia 2001, 17(2), 109-19), their large collection volume and substantial power requirements limit their applicability in personal samplers and analysis techniques.

An alternative to collection into bulk liquids are liquid droplet sprays. Kastner et al., J Air Waste Manag Assoc 2002, 52(4), 459-69. These systems have been most effective for removing aerosols larger than 1 μm from the air, but they are large (ranging from the size of a small appliance to an industrial smokestack) and have high energy consumption. Mussatti et al., in EPA Air Pollution Control Cost Manual 6ed. 2002. The physical phenomena governing the capture of aerosol by droplets in gas flows has been simulated for wet scrubbers (Jung et al., Environmental Engineering Science 2007, 24(3), 257-66; Gemci et al., Journal of Aerosol Science 1992, 23, 769-72; Kim et al., Environmental Engineering Science 2001, 18(2), 125-36) and has shown that it is possible to increase the capture efficiency of aerosols (including those smaller than 1.0 μm) by decreasing the droplet size and increasing droplet residence time in the scubber. Kim et al., Environmental Engineering Science 2001, 18(2), 125-36. The overall collection efficiency can be approximated by summing the modes of capture—diffusion, interception, inertial impaction, and gravitational settling. Gemci et al., Journal of Aerosol Science 1992, 23, 769-72. However, to accomplish high capture efficiency, wet scrubbers collect particles along large distances and timescales for effective operation, which is difficult to achieve in a small-scale device. The relationship between aerosol size and predominant mode of capture has previously been evaluated; impaction was found to be a predominant mode for the capture of aerosol sizes (dp)>5 μm, and diffusion for dp<1 μm. Jung et al., Environmental Engineering Science 2007, 24(3), 257-66. At dp<0.05 μm, impaction and interception are negligible and diffusion can be considered as the sole mode of capture. Interception is unaffected by flow rate, but changes with droplet size and packing. Lee, Journal of Aerosol Science 1981, 12(1), 79-87.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2A illustrates a cross-sectional view of flow through an example sampling device including six baffles. FIG. 2B illustrates flow of an impinging jet flowing in a direction that is perpendicular to a wall. FIG. 2C illustrates an example cross-section of an example baffle at four different times. FIG. 2D illustrates a diagram illustrating an example of coalesced droplets being collected.

FIG. 4 illustrates an example conceptual diagram of a process for analyzing a target captured by a sampling device.

FIG. 5 illustrates an example process for collecting a target.

FIG. 6 illustrates an example process for analyzing a captured target.

FIG. 11 illustrates images of cultured samples from the device after capturing a bioaerosol after being exposed to a negative control.

FIGS. 13A to 13C illustrate example pressure drops simulated in various example designs of the device. FIG. 13A illustrates pressure drops modeled with different device designs having different numbers of baffles. FIG. 13B illustrate example pressure drops modeled with different device designs having different baffle angles. FIG. 13C illustrates a pressure drop at a stagnation region in a device with six baffles and baffles angled at 30 degrees.

FIG. 15A illustrates the droplet size distribution of a first instance of the device, FIG. 15B illustrates the droplet size distribution of a second instance of the device, and FIG. 15C illustrates the droplet size distribution of a third instance of the device.

DETAILED DESCRIPTION

Figure 1:
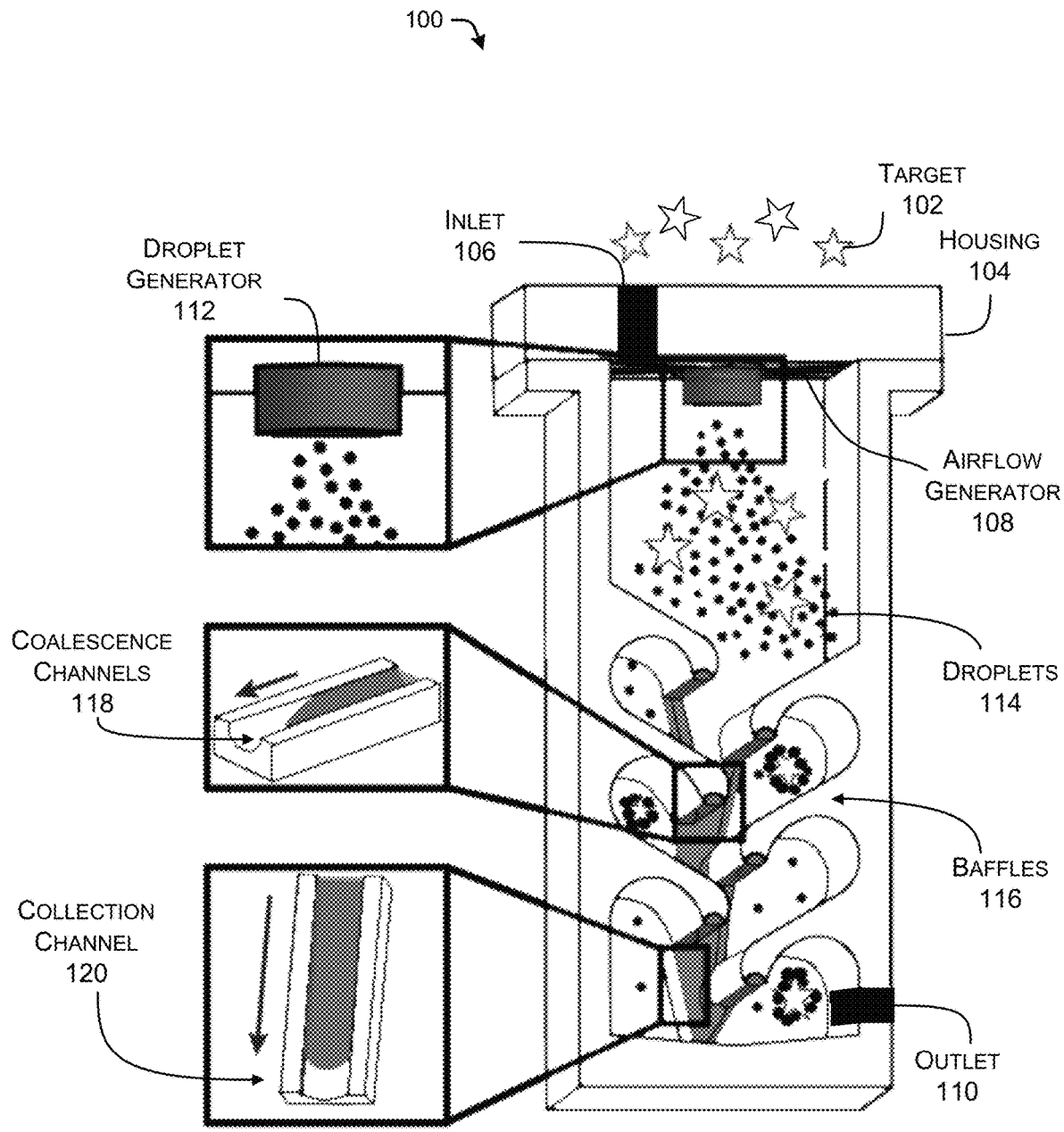
FIG. 1 illustrates an example sampling device configured to collect a target.

Aerosols dispersed and transmitted through the air (e.g., particulate matter pollution, bioaerosols) are ubiquitous and one of the leading causes of adverse health effects and disease transmission. A variety of sampling methods (e.g., filters, cyclones, impactors) have been developed to assess personal exposures. However, a gap still remains in the accessibility and ease-of-use of these technologies for people without experience or training in collecting airborne samples. Additionally, wet scrubbers utilize liquid sprays to remove aerosols from the air. However, these wet scrubbers are large and non-portable. There is a need for a portable and easy-to-operate air-sampling device to inform individuals of their environmental exposures and provide information on personalized health triggers.

Industrial wet scrubbers generate the required liquid droplets using large spray towers. Alternatively, an attractive method for generating liquid microdroplets is ultrasonic atomizers due to their compact size and use in existing consumer products such as industry for home humidifiers. Recent studies using ultrasonic atomizers to generate sprays of liquid microdroplets showed a decrease in particulate matter (PM) (with diameters of 2.5 μm and 10 μm) concentration over time when the microdroplets were injected near burning incense. Kim et al., Building and Environment 2020, 175, 106797.

Various implementations described herein relate to systems, devices, and methods for sampling targets in air. In some examples, a lightweight device is configured to capture the targets in the air. For example, the lightweight device flows a mixture of the air and liquid droplets through a nonlinear path that generates recirculation zones or "eddies" in the flow. This nonlinear path, for instance, is generated by the placement of baffles within the interior of the lightweight device. At these eddies, the liquid droplets spontaneously coalesce with the target in the air. The device may further transport the coalesced droplets and the target to a collection reservoir for further analysis. In some examples, the device includes meso- or microfluidic channels that collect and transport the coalesced droplets and target to a reservoir.

In specific implementations, a portable air-sampling device generates liquid droplets with widths in a range of 1 μm to 5 millimeters (mm). The device guides the droplets in a nonlinear flow path that increases the time droplets reside in the device. While flowing through the path, the droplets capture targets in air that also enters the device. The increased droplet residence time and droplet packing of various implementations described herein have enhanced capture efficiency over linear systems operating over similar distances. Due to the nonlinear flow path, the device may achieve satisfactory capture efficiency while remaining portable and a relatively small size. Open meso- or microfluidic channels in the device prevent accumulating droplets from blocking airflow and shuttle the coalesced droplets to the reservoir for future downstream analysis.

In various implementations described herein, a lightweight and low-cost portable device can be used to efficiently capture target particles within the air without technical training. The device may utilize liquid to capture aerosols for subsequent analysis. However, to maximize the time aerosolized microdroplets interact with target particles and maximize capture efficiency, the device flows the droplets and particles through a nonlinear path.

Implementations of the present disclosure address specific problems inherent in previous sampling systems. For example, the baffled internal geometries described herein can achieve a nonlinear flow pattern within a sampling device, thereby enabling the device to capture particles, aerosols, and other targets from the air while remaining relatively small and lightweight. Accordingly, various implementations described herein can be portable (e.g., battery-powered) and used for personal sample collection applications. For instances, various devices described herein can be small enough to fit on a desk or table, with dimensions that are less than 0.5 meters (m) by 0.5 m by 0.5 m. In contrast, existing wet scrubber systems are large and expensive, and are therefore impractical for use in personal sample collection applications.

In addition, many previous sampling systems capture targets on dry substrates. While this can be helpful for certain, nonliving targets, such dry substrates inherently desiccate biological targets. It is therefore difficult to perform further culture and analysis on biological targets captured using dry substrate systems. In contrast, various implementations of the present disclosure can capture biological targets in a fluid, which can prevent desiccation of the targets, even if they are captured for hours prior to analysis. As a result, the captured biological targets can be captured in a living form, so that they can be cultured during further analysis.

FIG. 1 illustrates an example sampling device 100 configured to collect a target 102. The target 102, for example, is a particle suspended in air. The air may be ambient to the example sampling device 100. In some implementations, the target 102 is part of an aerosol in the air. Examples of the target 102 include nonliving particles, such as volcanic ash, smoke, soot, cement dust, and saw dust The target 102 may include a biological material, such as a cell or virus. In particular cases, the target 102 includes a living cell, such as a bacterium, an archaea, or a eukaryotic cell. In various implementations, the width of the target 102 is within a range of 0.1 microns (μm) to 1 mm. For example, multiple instances of the target 102 may have a volumetric width in the range of 0.1 μm to 20 μm, 0.2 μm to 5 μm, or 0.5 μm to 4 μm. Some examples of eukaryotic cells include animal cells, plant cells, and fungal cells. In some cases, the target 102 includes a noncellular material, such as a viral particle. In some examples, the target 102 is an infectious agent, such as a coronavirus (e.g., SARS-CoV-2), a *Staphylococcus* bacterium, measles morbillivirus, *Mycobacterium tuberculosis*, influenza virus, or the like. In various implementations, the target 102 include an allergen.

In various implementations, a mixture of the target 102 and air is drawn into an interior space of a housing 104. The housing 104 at least partially encloses the interior space. In various cases, the mixture of the target 102 and air is drawn into the interior space through an inlet 106 in the housing 104. Although not specifically illustrated in FIG. 1, the housing 104 may have multiple inlets 106 through which the target 102 and air can enter the interior space. In various cases, the housing 104 includes one or more components that at least partially enclose the interior space. In some cases, the housing 104 includes a polymer (e.g., a thermoplastic or thermosetting polymer), a metal (e.g., steel and/or aluminum), or other moldable material. The housing 104 may be formed via injection molding, compression molding, three-dimensional (3D) printing, or other suitable manufacturing technique. For instance, the housing 104 may include an acrylic, a polyamide, polylactic acid, a polycarbonate, a polyethylene, a polyphenylene, a polypropylene, a polystyrene, polyvinyl chloride, polytetrafluoroethylene, a silicone, or a combination thereof.

In particular cases, the target 102 and the air is drawn into the housing 104 by an airflow generator 108. The airflow generator 108 is configured to move air into and through the housing 104. In some implementations, the airflow generator 108 includes at least one fan and/or at least one pump. Although the airflow generator 108 is illustrated in FIG. 1 as being disposed at or proximate to the inlet 106, implementations are not so limited. According to some cases, the airflow generator 108 may be disposed at or proximate to an outlet 110 of the housing 104. In various cases, the outlet 110 vents the interior space of the housing 104, thereby enabling the airflow generator 108 to move the air through the interior space of the housing 104 and the outlet 110.

The example sampling device 100 may also include a droplet generator 112. The droplet generator 112, in various implementations, is configured to generate droplets 114 of a liquid in the interior space of the housing 104. In some cases, the droplet generator 112 is fluidly coupled to a reservoir (not illustrated) that is configured to store the liquid in a bulk form. The droplet generator 112 may be located at an upper region of the housing 104, as illustrated in FIG. 1. Alternatively, the droplet generator 112 and the reservoir may be located at a lower region of the housing 104, such that the sampling device 100 disperses the droplets in an upward direction through the interior space of the housing 104. According to some examples, the droplet generator 112 includes an ultrasonic transducer configured to generate the droplets 114 by sonicating the bulk liquid. In particular cases, the droplet generator 112 includes an electrospray configured to apply a voltage to the liquid. The voltage causes the liquid to disperse into electrically charged liquid droplets that spontaneously disperse into the interior space of the housing 104 via Coulomb repulsion. In some examples, the droplet generator 112 includes a nozzle and a pump and the droplets 114 are generated by the pump forcing the liquid through the nozzle. The droplet generator 112 may include any device and/or component configured to generate the droplets 114.

The droplets 114, in various examples, are emitted into the interior space of the housing 104. In some examples, the droplets 114 have widths and/or diameters that are between a range of 1 µm and 5 mm, a range of 1 µm to 500 µm, a range of 5 µm to 50 µm, a range of 5 µm to 20 µm, or a range of 8 µm to 20 µm. For example, an example droplet among the droplets 114 may have an aerodynamic width (e.g., when settled in still air at the same velocity of the droplets 114 when the droplets 114 are at a density of 1 gram per cubic centimeter (cm)) of 5 µm, 8 µm, or 10 µm. Various liquids can be used to generate the droplets 114. In some cases, the droplets 114 include water. In various examples, the droplets 114 may include a hydrophilic liquid (e.g., water, an aqueous solution, etc.); a hydrophobic liquid (e.g., an oil); a non-Newtonian fluid; or some other liquid. The liquid may be selected based on the target 102. For example, a hydrophobic liquid may enhance capture of a target 102 with a hydrophobic surface. In some implementations, the liquid is a mixture and/or suspension of multiple constituent liquids, such as water and an oil. According to some cases, the viscosity of the liquid may be no more than 10, 9, or 8.5 $mm^2/s$.

The airflow generator 108 may move the droplets 114 in the interior space of the housing 104 along with the air and the target 102. In various cases, the droplets 114 will physically encounter the target 102 in the interior space due to the airflow. In some cases, the droplets 114 may attach to the target 102. The droplets 114 may physically weigh down the target 102.

The geometry of the interior surface of the housing 104 may manipulate the flow of the air, droplets 114, and target 102 within the interior space. According to various implementations, the geometry generates a nonlinear path by which the air, droplets 114, and target 102 flow through the interior space. In particular, the housing 104 may include multiple baffles 116 that extend into the interior space. The baffles 116 may be continuous with the interior surface of the housing 104. In some cases, the baffles 116 are separable from the rest of the housing 104. For instance, the baffles 116 may be slidably connected to the interior surface of the housing 104.

The baffles 116 may be configured to generate regions of turbulence within the flow of the air, droplets 114, and the target 102 in the interior space. In some cases, the baffles 116 are configured to generate eddies of flow in the interior space. In these eddies, the instantaneous velocity of the droplets and the target 102 are equal to or approach zero. Accordingly, the target 102 weighed down by the droplets 114 may coalesce at the generated eddies. In various cases, the eddies are located between adjacent baffles 114, such that the droplets and the target 102 drop down onto upper surfaces of the baffles 114 located below the eddies. According to some cases, the lower surfaces of the baffles are curved (e.g., concave), which can facilitate the creation of the eddies. In addition, at least a portion of the upper surfaces of the baffles 116 may be curved (e.g., convex), which can facilitate the movement of the coalesced droplets 114 and target down to edges of the baffles 116 due to gravitational forces on the coalesced droplets 114. In various implementations, the upper surfaces of the baffles are hydrophobic, which may further facilitate the movement of the coalesced droplets. For example, the upper surfaces may be coated in polytetrafluoroethylene or some other hydrophobic material. The edges of the baffles 116 may connect the upper surfaces of the baffles 116 to the lower surfaces of the baffles 116.

Various geometries of the baffles 116 may facilitate collection of the target 102. In some cases, the baffles 116 are nonparallel to the direction at which the airflow generator 108 pushes the air, target 102, and droplets 114 through the interior space of the housing 104 (also referred to as the "flow direction"). In various examples, the baffles 116 are nonparallel to sidewalls of the interior space of the housing 104. For example, the upper surfaces of the baffles 116 may respectively include flat portions that are disposed at angles in a range of 0 to 90 degrees, 5 to 85 degrees, 10 to 80 degrees, 10 to 45 degrees, or 15 to 30 degrees with respect to the flow direction, the sidewalls of the interior space of the housing 104, or the direction of gravity.

The spacing between adjacent baffle 116 may impact the creation of the eddies. For example, a first baffle 116 may be spaced apart from a second baffle 116 by a distance of 1 mm to 10 mm. For example, the baffles 116 may be spaced apart by a vertical distance of 5 mm to 20 mm (e.g., 9 mm), and the baffles 116 may be spaced apart by a horizontal distance of 1 mm to 5 mm (e.g., 4 mm). In particular instances, the baffles 116 are spaced apart by a vertical distance of 2 mm, 9 mm, or 19.5 mm. In some cases, the geometries of the baffles can be optimized based on the type of target 102 being captured, the flow rate generated by the airflow generator 108, the diameter of the droplets 114, the liquid included in the droplets 114, or any combination thereof.

According to various implementations, coalescence channels 118 may be disposed on the edges of the baffles 116. The coalesced droplets 114 and target 102 are transported along the upper surfaces of the baffles 116 into the coalescence channels 118 due to the curvature of the upper surfaces and gravity. In some cases, the upper surfaces of the baffles 116 are hydrophobic, which may enhance the transport of hydrophilic droplets 114 into the coalescence channels 118. The coalescence channels 118 may be open channels that are exposed to the interior space of the housing 104. In some examples, the coalescence channels 118 are partially enclosed, and may have one or more holes that enable the coalesced droplets 114 and target 102 to enter the coalescence channels 108. The coalescence channels 118, in various implementations, may transport the coalesced droplets 114 and target 102 to a collection channel 120 on a wall of the interior space of the housing 104. In some cases, the coalesced droplets 114 spontaneously move to the collection channel 120 via capillary action. For example, the coalescence channels 118 may be meso- or microfluidic channels that support capillary action of the liquid in the droplets 114.

The collection channel 120 is configured to transport the collected mixture of the liquid and the target 102 to a sample reservoir (not illustrated). In various cases, the sample reservoir is located below the interior space of the housing 104. The sample reservoir may be configured to hold the liquid and the target 102. In some examples, the sample reservoir may be removed from the rest of the sampling device 100. Accordingly, a user may access the captured target 102 in the sampling reservoir for further analysis.

Although not illustrated in FIG. 1, in various implementations, the sampling device 100 includes a power supply that provides electrical energy to one or more components of the sampling device 100. The power supply may include at least one battery, at least one capacitor, or some other energy storage element. For example, the power supply may supply electrical energy to the airflow generator 108 and/or the droplet generator 112. In some implementations, a single battery (e.g., a single 9 Volt (V) battery) powers both the airflow generator 108 and the droplet generator 112.

Figure 2A:
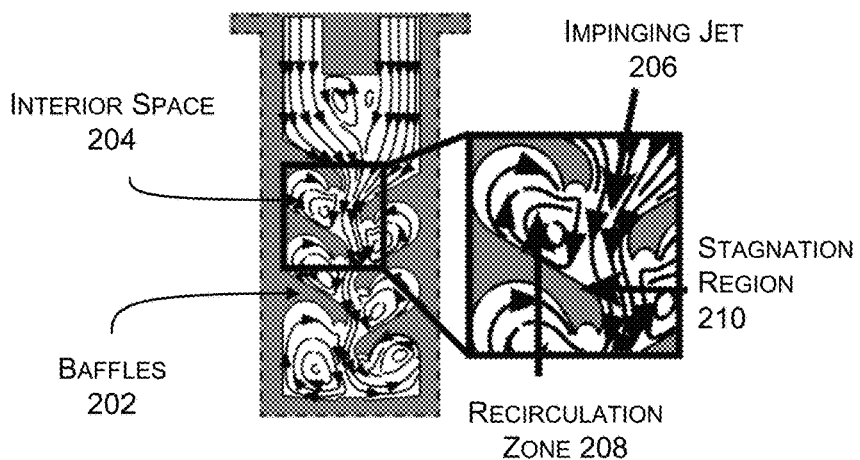
FIGS. 2A to 2D illustrate further details of baffles used in implementations of the present disclosure.

FIGS. 2A to 2D illustrate further details of baffles used in implementations of the present disclosure. FIG. 2A illustrates a cross-sectional view of flow through an example sampling device 200 including six baffles 202. The flow may include air, targets, droplets, or any combination thereof. The baffles 202 may define edges of an interior space 204 of the sampling device 202. Due to the presence of the baffles 202, the flow through the interior space 204 is nonlinear. For example, the flow through the interior space 204 changes direction as the flow travels from the top of the sampling device 202 to the bottom of the sampling device 202. The nonlinear path of the flow through the interior space 204 is one of many distinctions between the example sampling device 200 and a wet scrubber. A wet scrubber, in contrast to the sampling device 202, directs flows through a linear path that does not include any significant changes in direction through the wet scrubber itself. Furthermore, the interiors of many conventional wet scrubbers are linear and is devoid of baffles.

The direction of the flow through the interior space 204 is illustrated in FIG. 2A by arrows. In various implementations, the flow includes an impinging jet 206 that travels between a first row of the baffles 202 on the left side of the sampling device 202 and a second row of the baffles 202 on the right side of the device. The impinging jet 206 may represent the most direct path that the flow can take from the top of the sampling device 202 to the bottom of the sampling device 202. However, even this most direct path causes the flow to change direction through the interior space 204.

The baffles 202 further cause the flow to form recirculation zones 208 between vertically adjacent baffles 202. In the recirculation zones 208, the flow follows a top edge of a lower baffle 202 and turns upward to follow a lower edge of an upper baffle 202. In various implementations, an example recirculation zone 208 includes one or more eddies of the flow.

In particular examples, the flow also forms one or more stagnation regions 210. For example, the stagnation regions 210 may be located between the impinging jet 206 and the recirculation zones 208. The flow at the stagnation regions 210 may cease, such that the instantaneous flow velocity at the stagnation regions 210 is substantially equal to zero.

In various implementations, droplets in the flow coalesce at the recirculation zones 208 and the stagnation regions 210. The flow in the recirculation zones 208 and the stagnation regions 210 may have a relatively low Stokes number (e.g., <0.03). The coalescence may occur as droplets accumulate and transition to liquid effluent. In various cases, droplet accumulation is enhanced in an environment that is supersaturated with droplets. Accordingly, highest probability of droplet coalescence and heterogeneous growth occurs in regions with long residence time (e.g., the lowest instantaneous flow velocity) and high droplet concentration. In the geometry of this device, these conditions are present at the stagnation regions 210 and in the recirculation zones 208. Because the droplets may carry a target as they flow through the interior space 204, the liquid effluent from the coalesced droplets also carry the target.

Figure 2B:
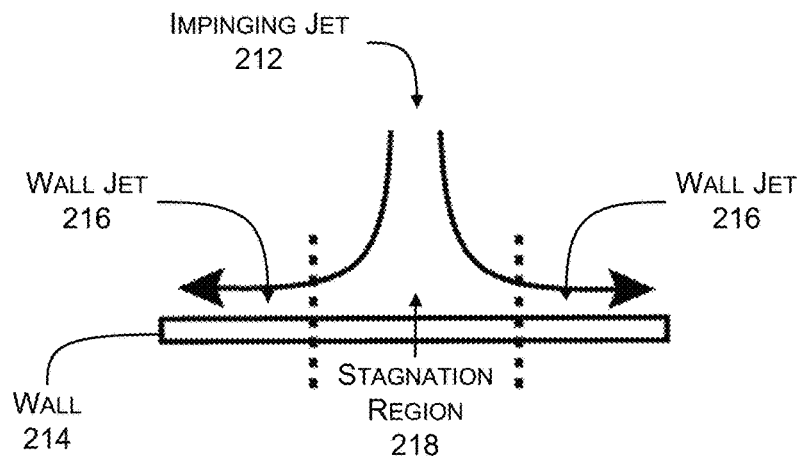

FIG. 2B illustrates flow of an impinging jet 212 flowing in a direction that is perpendicular to a wall 214. In particular, the impinging jet 212 flows toward the wall 214. Due to the presence of the wall 214, the impinging jet 212 is divided into multiple wall jets 216 that follow the edge of the wall 214. A stagnation region 218 is spontaneously formed in a region between the wall jets 216 and the impinging jet 212 on the surface of the wall 214. If this impinging jet 212 carries droplets, those droplets are more likely to coalesce in the stagnation region 218 than in the impinging jet 212 and the wall jets 216. This is because turbulence within the stagnation region 218 may include at least one region where the droplets reach a minimal or zero velocity with a high concentration.

Figure 2C:
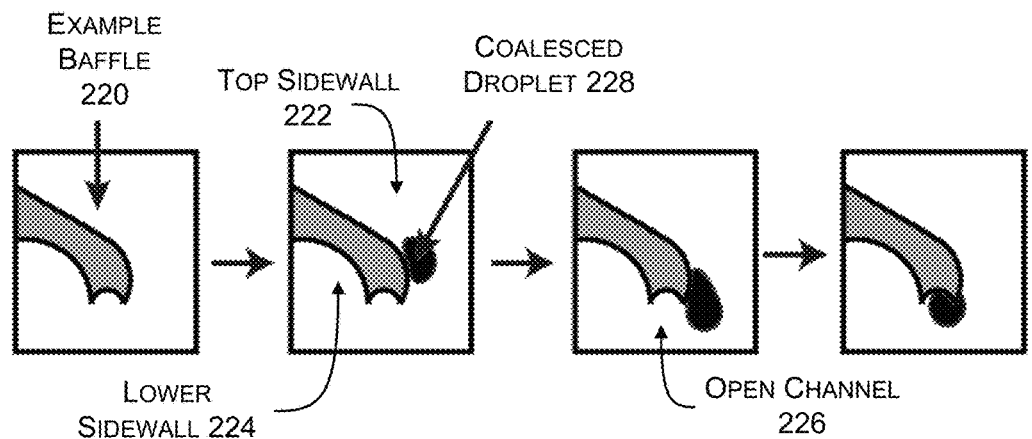

FIG. 2C illustrates an example cross-section of an example baffle 220 at four different times. As shown, the example baffle 202 includes a curved (e.g., concave) top sidewall 222 and a curved (e.g., concave) lower sidewall 224. In addition, the baffle 220 includes an open channel 226 disposed between the top sidewall 222 and the lower sidewall 224. For instance, the open channel 226 includes a concave sidewall that is connected to the top sidewall 222 and the lower sidewall 224 at acute corners. In various implementations, the example baffle 220 extends into an interior space of a sampling device. For example, the top sidewall 222 and the lower sidewall 224 are sidewalls of the interior space of the sampling device.

In various implementations, a flow profile through the interior space includes a stagnation region located along the top sidewall 222 of the example baffle 202. Due to the stagnation region, various microdroplets in the flow coalesce to form a coalesced droplet 228 disposed on the top sidewall 222. In various cases, the angle of the top sidewall 222 with respect to gravity, the curvature of the top sidewall 222, or both, cause the coalesced droplet 228 to spontaneously move along the top sidewall 222 towards the open channel 226. In various implementations, the coalesced droplet 228 enters the open channel 226.

Although not specifically illustrated in FIG. 2C, the dimensions of the open channel 226 may cause the coalesced droplet 228 to spontaneously move in a direction crossing the plane of the cross-sections of the example baffle 220 via capillary action. For example, the open channel 226 is a meso- or microfluidic channel. In various cases, the coalesced droplet 228 is transported by the open channel 228 to a collection reservoir. Thus, any targets include in the coalesced droplet 228 may be sampled by a user and detected during downstream analysis.

Figure 2D:
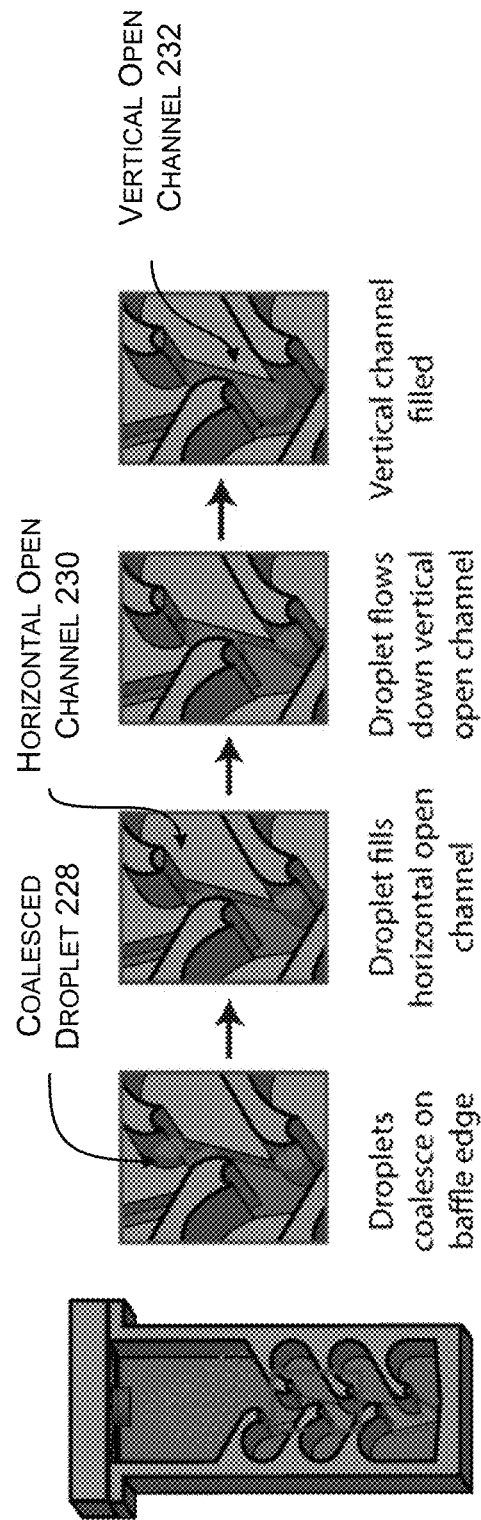

FIG. 2D illustrates a diagram illustrating an example of coalesced droplets being collected. As shown, the coalesced droplets 228 accumulate on the edge of the example baffle 200. The coalesced droplets 228 enter a horizontal open channel 230, which may be a coalescence channel. The coalesced droplets 228 flow along the horizontal open channel 230 toward a vertical open channel 232, which may be a collection channel. The coalesced droplets 228 may flow along the vertical open channel 232 toward a collection reservoir. Accordingly, the coalesced droplets 228 may efficiently transport the captured target into the collection reservoir.

Figure 3:
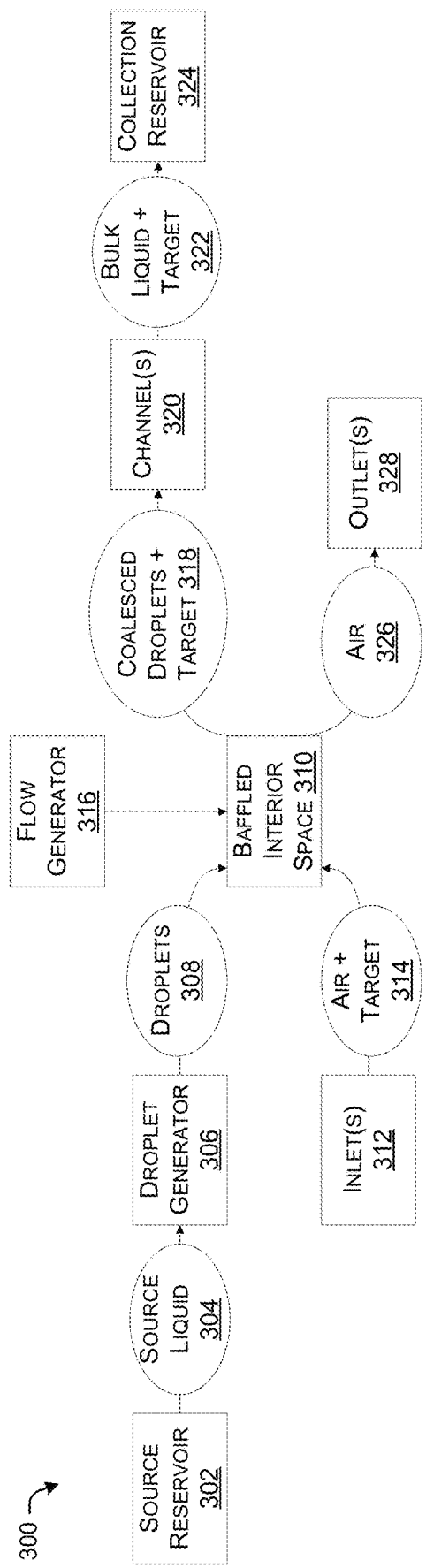
FIG. 3 illustrates an example conceptual diagram of the transition of various materials by a sampling device during operation of the sampling device.

FIG. 3 illustrates an example conceptual diagram 300 of the transition of various materials by a sampling device during operation of the sampling device. In the conceptual diagram 300, components of the sampling device are depicted as rectangles and materials acted upon by the sampling device are depicted as ovals.

In various implementations, a source reservoir 302 stores a source liquid 304. In various implementations, the source reservoir 302 includes a cup or other vessel configured to store liquid. The source liquid 304, in some examples, includes water. For instance, the source liquid 304 may be an aqueous solution including a material configured to bind to a target of interest (e.g., an antibody with a specific binding domain corresponding to the target-of-interest, a hydrophobic material configured to capture a hydrophobic site on the target-of-interest, etc.) and/or a material configured to stabilize the target of interest for later transport and analysis (e.g., phosphate buffered saline (PBS), RNAlater™ by Thermo Fisher Scientific of Waltham, MA, bovine serum albumin (BSA), one or more peptides (e.g., tryptone, soytone, etc.), one or more sugars (e.g., glucose), one or more salts (e.g., ethylenediaminetetraacetic acid (EDTA)), etc.). In some implementations, the source liquid 304 includes an oil. In various cases, a viscosity of the source liquid 304 may be below 10 mm²/s.

A droplet generator 306 generates droplets 308 from the source liquid 304. In various implementations, the droplet generator 306 includes a spray nozzle, an ultrasound transducer, or an electrospray device. In examples in which the droplet generator 306 includes an ultrasound transducer, the ultrasound transducer may operate at a frequency between 20 kHz and 10 MHz. The droplets 308, in various cases, have widths in a range of 1 to 5 mm, such as an average aerodynamic width of 10 μm. For instance, the droplets 308 are microdroplets. In some implementations, the droplets 308 form an aerosol. The droplet generator 306 provides the droplets 308 to a baffled interior space 310.

In addition, one or more inlets 312 provide a mixture of air and a target 314 to the baffled interior space 310. The inlet(s) 312 may fluidly connect the interior space 310 to an exterior sampling environment. In various cases, the inlet(s) 312 include one or more holes and/or slits in the sampling device.

In various cases, a flow generator 316 generates a flow within the baffled interior space 310. The flow generator 316, for instance, may include at least one fan, at least one pump, or a combination thereof. The flow generator 316 may be configured to draw the air and the target 314 into the baffled interior space 310. In addition, the flow generator 316 may be configured to generate a flow in the baffled interior space 310 that carries the droplets 308 as well as the air and the target 314 through a flow path in the baffled interior space 310. Within the flow, the droplets 308 may capture (e.g., attach to) the target. The combinations of the droplets 308 and the target may weigh down the target within the baffled interior space 310.

The shape of the flow path may be dependent on the shape of the interior surface of the baffled interior space 310. In various implementations, the flow path is nonlinear due to the presence of baffles in the interior space 310. The baffles may be removably connected to the surface of the baffled interior space 310 and/or may be continuous with the surface of the baffled interior space 310. The baffles, in various examples, may direct an impinging jet carrying the droplets 308 as well as the air and the target 314 along a nonlinear path between multiple rows of baffles. In addition, the baffles may split the impinging jet into one or more recirculation zones that flow between adjacent baffles in the same row. Stagnation regions may be formed between the impinging jet and the recirculation zones, as well as within the recirculation zones themselves. In various cases, the stagnation regions are disposed on upper surfaces of the baffles in the baffled interior space 310. At these stagnation regions, the droplets attached to the targets may coalesce.

Based on the interaction between the flow of the droplets 308 and the air and target 314 in the baffled interior space 310, a mixture of coalesced droplets and target 318 are generated. In various cases, the coalesced droplets and target 318 slide down the upper surfaces of the baffles. The coalesced droplets and target 318 may enter one or more channels 320. The channel(s) 320, for example, include coalescence channels integrated with the baffles themselves. In various cases, the channel(s) 320 may also include one or more collection channels that receive liquid flowing from the collection channels. For instance, the collection channel (s) may be configured to drain the coalescence channels. The channel(s) 320 may be meso- and/or microfluidic channels. Accordingly, liquid in the channel(s) 320 may spontaneously flow along the channel(s) 320 via capillary action. In some implementations, the channel(s) 320 are connected to one or more liquid pumps configured to actively move the liquid in the channel(s) 320.

The channel(s) 320 convert the coalesced droplets and target 318 into a mixture of a bulk liquid and target 322. The channel(s) 320 transport the bulk liquid and target 322 to a collection reservoir 324. In various implementations, the collection reservoir 324 is accessible to a user for downstream analysis. For example, the collection reservoir 324 may be removable from the rest of the sampling device.

In addition, the separated air 326 leaves the baffled interior space 310 via one or more outlets 328. The outlet(s) 328 may vent the baffled interior space 310 such that the flow generator 315 may draw further air and target into the baffled interior space 310 for further sampling.

FIG. 4 illustrates an example conceptual diagram 400 of a process for analyzing a target captured by a sampling device. In various implementations, a sample 402 is obtained from the collection reservoir 324 of the sampling device. In some implementations, the collection reservoir 324 can be removed from the rest of the sampling device. In particular cases, the liquid collected in the collection reservoir 324 can be accessed by outlet(s) in the sampling reservoir, a sliding door in the housing of the sampling device, or the like. According to some implementations, a pipet and/or microfluidic device is configured to extract the sample 402 from the collection reservoir 324. The sample 402 may include a mixture of a bulk liquid and a target-of-interest.

The sample 402 is deposited in a transport vessel 404. In some examples, the transport vessel 404 includes a polymer vial or cup. For example, the transport vessel 404 may include polypropylene and/or polystyrene. In some examples, the transport vessel 404 may be sealed. Accordingly, the transport vessel 404 may be transported across a distance for analysis. In some cases, the transport vessel 404 may be mailed.

The sample 402 is transferred from the transport vessel 404 into a growth vessel 406. According to some examples, the growth vessel 406 may be a petri dish, a culture flask, a culture tube, or other suitable vessel configured to accommodate biological growth. In some examples, the growth vessel 406 includes polypropylene and/or polystyrene.

In addition, a growth medium 408 is added to the growth vessel 406. The growth medium 408 may include a broth or other culture medium. The growth medium 408 may be a solid, a liquid, or a semi-solid substance. In some examples, the growth medium 408 includes agar. In various implementations, if the target-of-interest includes a virus, the growth medium 408 may include live cells configured to be infected by the virus.

After culture, a cultured sample 406 is present in the growth vessel 406. The cultured sample 406 may be analyzed for the target. In some examples, optical analysis can be used to detect the presence of the target. For example, the target is detected in the cultured sample 406 via spectrophotometry or microscopy. In some examples, colonies of the target (or cells infected with the target) are manually observed in the cultured sample 406. Accordingly, the presence of the target-of-interest in the collection reservoir 324 can be observed.

FIG. 5 illustrates an example process 500 for collecting a target. The example process 500 may be performed by an entity, such the sampling device 100 described above with reference to FIG. 1.

At 502, the entity generates droplets. In various implementations, the entity includes a droplet generator that generates the droplets. The droplet generator, for example, includes a nozzle, an ultrasound transducer, an electrospray, or a combination thereof. In various cases, the entity generates the droplets from a liquid stored in a reservoir. The liquid, for example, may include water or other hydrophilic material. In some cases, the liquid includes an oil (e.g., mineral oil) or some other hydrophobic material. In particular implementations, the liquid includes a material configured to stabilize a biological material, such as RNAlater, BSA, PBS, one or more peptides (e.g., tryptone, soytone, etc.), one or more sugars (e.g., glucose), one or more salts (e.g., EDTA), or any combination thereof.

At 504, the entity flows a mixture of droplets, air, and a target through a baffled interior space. In various implementations, the entity includes one or more fans and/or one or more pumps configured to move the droplets, air, and the target. In some implementations, the entity includes a housing with one or more inlets that receive air external to the entity. The air may carry the target, such that both the air and the target enter an interior space of the housing. The interior space of the housing may include one or more baffles. The baffle(s), in various cases, cause the flow of the droplets, air, and target to move along a nonlinear path through the interior space of the housing. In the interior space, the droplets may attach or otherwise combine with the target.

At 506, the entity coalesces the droplets and the target on a surface of a baffle in the interior space. In particular, the baffle(s) may generate one or more recirculation zones in the interior space. At the recirculation zones and/or a surface of the baffle(s), the droplets, air, and the target may reach a zero-velocity state. At this point, the droplets may coalesce and precipitate onto the surface of the baffle(s). The coalesced droplets form a liquid that may carry the target, thereby drawing the target out of the air circulating in the interior space of the housing.

At 508, the entity transports the target and liquid to a collection reservoir. In various cases, the shape of the baffle(s) can facilitate the transport of the target and the liquid. For example, the surface of the baffle(s) may be curved and may be non-perpendicular to the direction of gravity. Gravity may pull the liquid carrying the target down the surface of the baffle(s) onto an edge of the baffle(s). In some cases, the edge of the baffle(s) may include at least one coalescence channel, which may be open to the interior space and/or include one or more holes that are open to the interior space. The liquid carrying the target, upon entering the coalescence channel(s), may spontaneously propagate (e.g., move) along the coalescence channel(s), such as by capillary action. For instance, the coalescence channel(s) may be microfluidic and/or mesofluidic channel(s). In some cases, the coalescence channel(s) are fluidly connected to one or more collection channels. In some cases, the collection channel(s) may traverse a sidewall of the interior space of the housing. The collection channel(s) may be fluidly connected to the collection reservoir. In various implementations, the liquid carrying the target propagates through the collection channel(s) and into the collection reservoir. For example, the collection channel(s) include microfluidic and/or mesofluidic channel(s) that enable the liquid and target to move spontaneously via capillary action. In some cases, the collection channel(s) are coupled to one or more pumps configured to move the liquid and target into the collection reservoir. In various implementations, the collection reservoir holds the liquid and target. The liquid may prevent desiccation of the target. In some cases, a sample of the liquid and the target can be collected from the collection reservoir for further analysis.

FIG. 6 illustrates an example process 600 for analyzing a captured target. In some examples, the process 600 is performed by an entity including one or more microfluidic and/or cell culture devices.

At 602, the entity collects a target and liquid from a collection reservoir. In some implementations, the mixture of the target and the liquid is collected via a pipet or microfluidic device. According to various cases, the target is a biological target, such as a cell or virus.

At 604, the entity adds a sample of the target and liquid to a growth medium. According to some implementations, the growth medium is a broth (e.g., Luria-Bertani (LB) broth) and/or serum (e.g., bovine serum albumin (BSA)). In some examples, growth medium includes host cells. Accordingly, if the target is a virus, the virus may infect the host cells. The growth medium may include nutrients for the target. In some examples, the growth medium further includes one or more materials that are toxic to other types of biological materials. For example, the growth medium may include one or more antibiotics that are toxic to bacteria other than the target.

At 606, the entity cultures the sample in the growth medium. In some implementations, the entity incubates the sample in the growth medium. According to some examples, the entity circulates the growth medium and/or provides supplemental oxygen to the growth medium. In various cases, the entity controls the pH of the sample in the growth medium by adding one or more buffer materials, wherein the entity maintains the pH of the sample in the growth medium within a particular range.

At 608, the entity confirms the presence of the target based on the cultured sample. In some cases, the presence of the target can be manually observed, by counting cultures or cloudiness of the growth medium. In various examples, the presence of the target can be confirmed using a cell counter, such as a Coulter counter. According to various cases, the presence of the target can be confirmed using fluorescence imaging (e.g., in cases where the target or an additive to the growth medium is configured to fluoresce in the presence of an excitation light). In some implementations, the presence of the target can be confirmed based on an absorbance and/or transmittance of the cultured sample to light, such as using a spectrophotometer.

Although 604 and 606 indicate that the sample is cultured prior to analysis, implementations are not so limited. For example, the entity may confirm the presence of the target in the sample by directly detecting the target without culturing the sample.

EXPERIMENTAL EXAMPLES

The present experimental example describes a device fundamentally different from existing portable air samplers by using aerosolized microdroplets to capture aerosols in personal spaces (e.g., homes, offices, schools). The aerosol-sampling device is the size of a small teapot, can be operated without specialized training, and features a winding flow path in a supersaturated relative humidity environment enabling droplet growth. The integrated open mesofluidic channels shuttle coalesced droplets to a collection chamber for subsequent sample analysis. The experimental demonstration of aerosol capture into water droplets is also presented in this example. Iterative study optimized the non-linear flow manipulating baffles and enabled an 83% retention of the aerosolized microdroplets in the confined volume of the device. As a proof-of-concept for aerosol capture into a liquid medium, 0.5-3 µm model particles were used to evaluate aerosol capture efficiency. Finally, the description herein demonstrates that the device can capture and keep a bioaerosol (bacteriophage MS2) viable for downstream analysis.

The device harnesses the benefits of microdroplet liquid sprays to fill the need for an accessible and portable, at-home air-sampling device that collects aerosols in a liquid compatible with downstream analysis methods. The device is a novel, battery-powered air-sampling device that uses aerosolized microdroplets to capture aerosol targets for analysis. The function and performance of the device is demonstrated using model fluorescent aerosol. Accordingly, the results inform how the device can be used for bioaerosol collection.

The portable air-sampling device generates a mist of 4 µm-wide liquid droplets and mixes it with aerosols. The device guides the mixture in a non-linear path to keep microdroplets suspended in the open spaces of the device for as long as possible. The droplet residence time (time the droplet spends suspended in a gas flow) along with droplet packing (number of droplets present) has been shown to increase capture efficiency. Kim et al., Environmental Engineering Science 2001, 18(2), 125-36. This example demonstrates that aerodynamic features enable the capture of the generated mist in a reduced volume and present optimization criteria for device geometry. By leveraging the principles of open microfluidics, the device provides a pathway via horizontal and vertical open mesofluidic channels for the coalesced droplets to travel and collect for future downstream analysis. See Kim et al., Building and Environment 2020, 175, 106797; Berthier, et al., Analytical Chemistry 2019, 91(14), 8739-50. This example also evaluates the effect of flow patterns on droplet retention efficiency and the model aerosol capture efficiency for target particles in a 0.5-3.0 µm range. Finally, this example demonstrates that the device can capture and keep a bioaerosol viable for downstream analysis.

Device Fabrication

The body of the device and ultrasonic atomizer cup were designed in Solidworks 2017 and 3D printed out of black resin (RS-F2-GPBK-04) using a Form 2 or Form 3 stereolithography 3D printer (from Formlabs of Somerville, MA). The parts were cleaned in isopropyl alcohol (IPA) for 10 minutes in a FormWash (Formlabs) and rinsed down with clean IPA to remove excess uncured resin. Three instances of the device were fabricated and tested in this experimental example. The devices were dried with compressed air and cured under a 395-405 nm 20W UV lamp (from QUANS) for 1 hour. A 1.3 mm PS thick window was milled (using a Datron Neo from DATRON Dynamics Inc. of Milford, NH) to enable visual access to the capture region of the device.

Portable Electronics

The ultrasonic atomizer (Comidox) with a frequency of 113 KHz and 730 apertures, each 5 µm in diameter, was adhered to the floor of the ultrasonic atomizer cup with 100% silicone caulk (Gorilla Glue™ from Gorilla Glue Company of Sharonville, OH). A 40 mm square computer fan (Model OD4010-05HB55, Orion Fans of Dallas, TX) was used to generate airflow. The voltage delivered to the fan was controlled by a microcontroller (Arduino Micro, Arduino of Somerville, MA). A darlington transistor (TIP122, STMicroelectronics of Geneva, Switzerland), 100 Ohm resistor (SparkFun Electronics of Boulder, CO), 22 and 24 AWG jumper wires (OSEPP Electronics LTD of Tempe, AZ), and 2.1 mm male and female barrel jacks (Centropower of Shenzhen, China) were used. The ultrasonic atomizer and the fan were powered by a single 9V battery (Zeus Battery Products of Bloomingdale, IL).

Device Design

Various designs of the device were tested for droplet retention. These designs were tested both using computer simulations and experimentally.

Figure 7A:
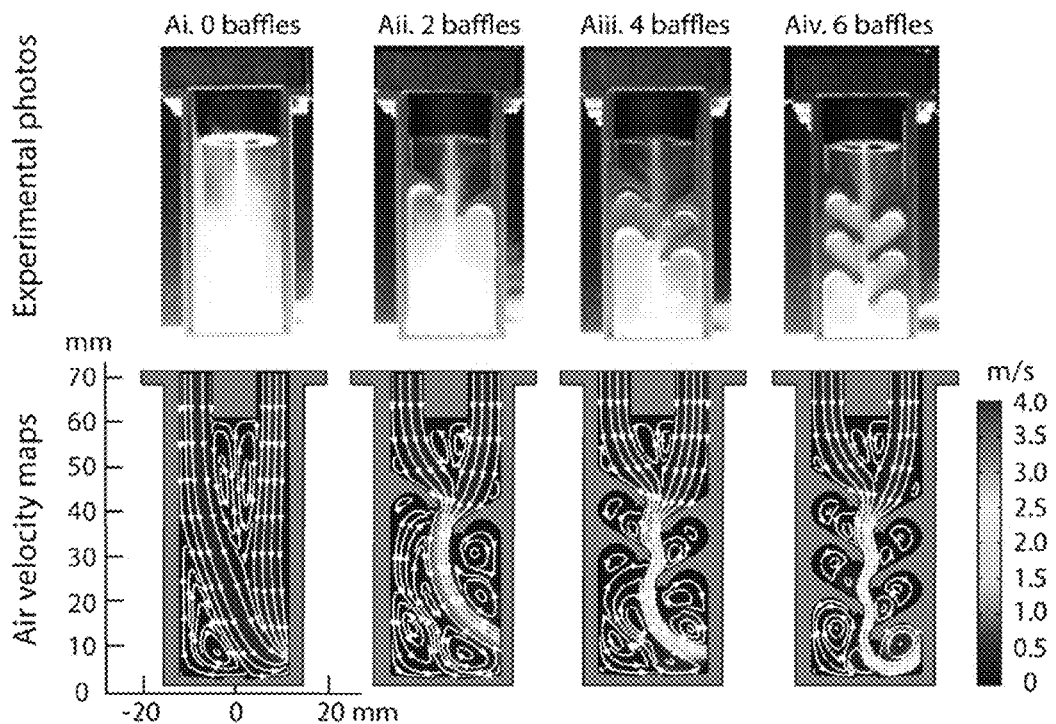
FIG. 7A illustrates simulations of air flow and velocity in different device geometries with varying numbers of baffles disposed in the interior of the device.
Figure 7B:
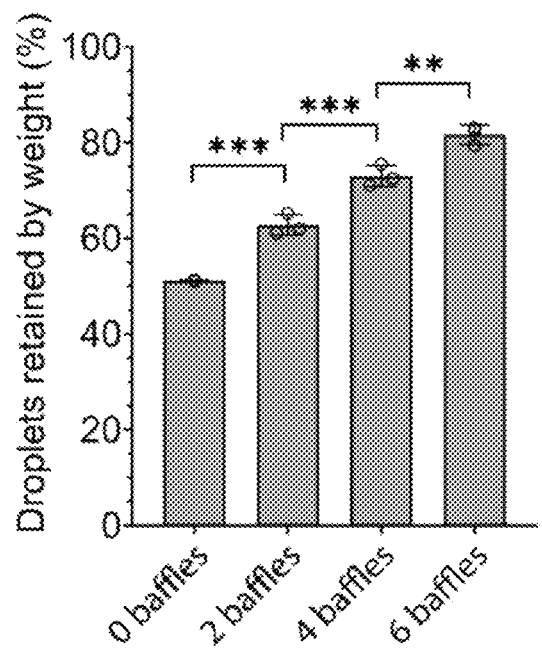
FIG. 7B illustrates droplets retained by weight (in percentage) of the different device geometries with varying numbers of baffles.

FIG. 7A illustrates simulations of air flow and velocity in different device geometries with varying numbers of baffles disposed in the interior of the device. FIG. 7B illustrates droplets retained by weight (in percentage) of the different device geometries with varying numbers of baffles.

Figure 8A:
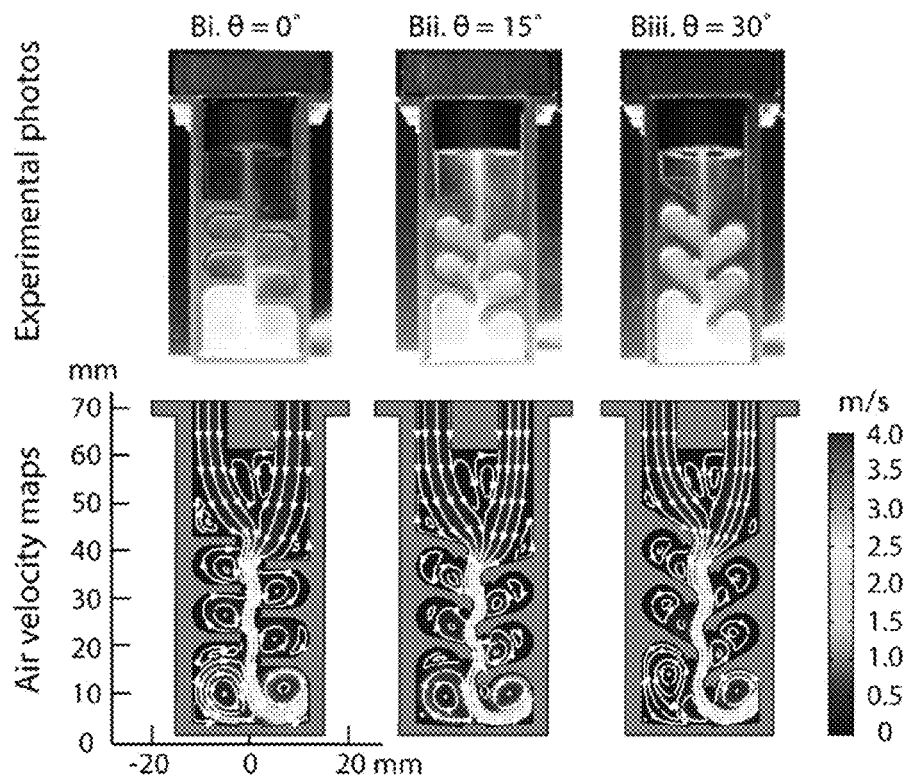
FIG. 8A illustrates simulations of air flow and velocity in different device geometries with varying baffle angles.
Figure 8B:
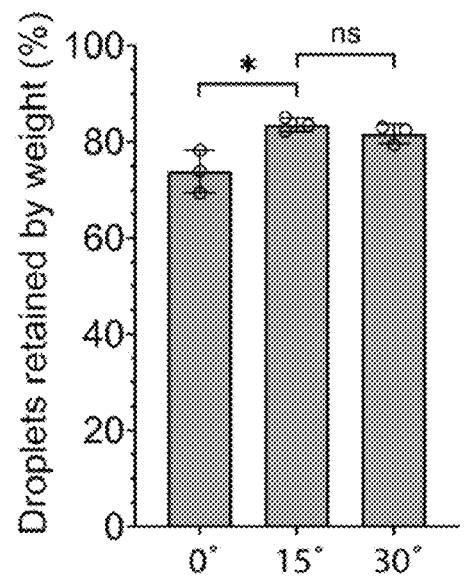
FIG. 8B illustrates droplets retained by weight (in percentage) in the different device geometries with varying baffle angles.

FIG. 8A illustrates simulations of air flow and velocity in different device geometries with varying baffle angles. FIG. 8B illustrates droplets retained by weight (in percentage) in the different device geometries with varying baffle angles.

Simulations

Computational Fluid Dynamics Module in COMSOL Multiphysics™ v5.5 (COMSOL Inc. of Burlington, MA) software was used to simulate the air flow and pressure in different device geometries in a stationary study. A 2D cross-section of our 3D device was modeled. The Laminar Flow physics interface, governed by the Navier-Stokes equations, was selected to model air flow in the device based on the estimated Reynolds number calculated (Re<1200). Two fan inlets with a fully developed flow profile, initial flow rate=6.3 L/min, and entrance thickness of 0.02 m was used. An outlet boundary was defined by P=0 Pa with backflow suppressed. No slip boundary conditions were applied to all remaining boundaries. A fine element quadrilateral mesh with extra fine element boundary refinement at the baffles was used. FIGS. 7A and 8A illustrate examples of these simulations.

Droplet Retention Gravimetric Analysis Using Nonportable Electronics Setup

Droplet retention was measured by weighing the ultrasonic atomizer cup filled with water and each 3D printed body separately using an analytical balance (Mettler Toledo ME103E) before and after operating the device for 30 seconds with the fan operating at 25% voltage for an airflow rate of 6.3 L/min. That is, devices with different baffle angles and baffle numbers were physically fabricated and tested in accordance with this test. The results of these analyses are illustrated in FIGS. 7B and 8B.

Aerosol Capture Efficiency

Figure 9:
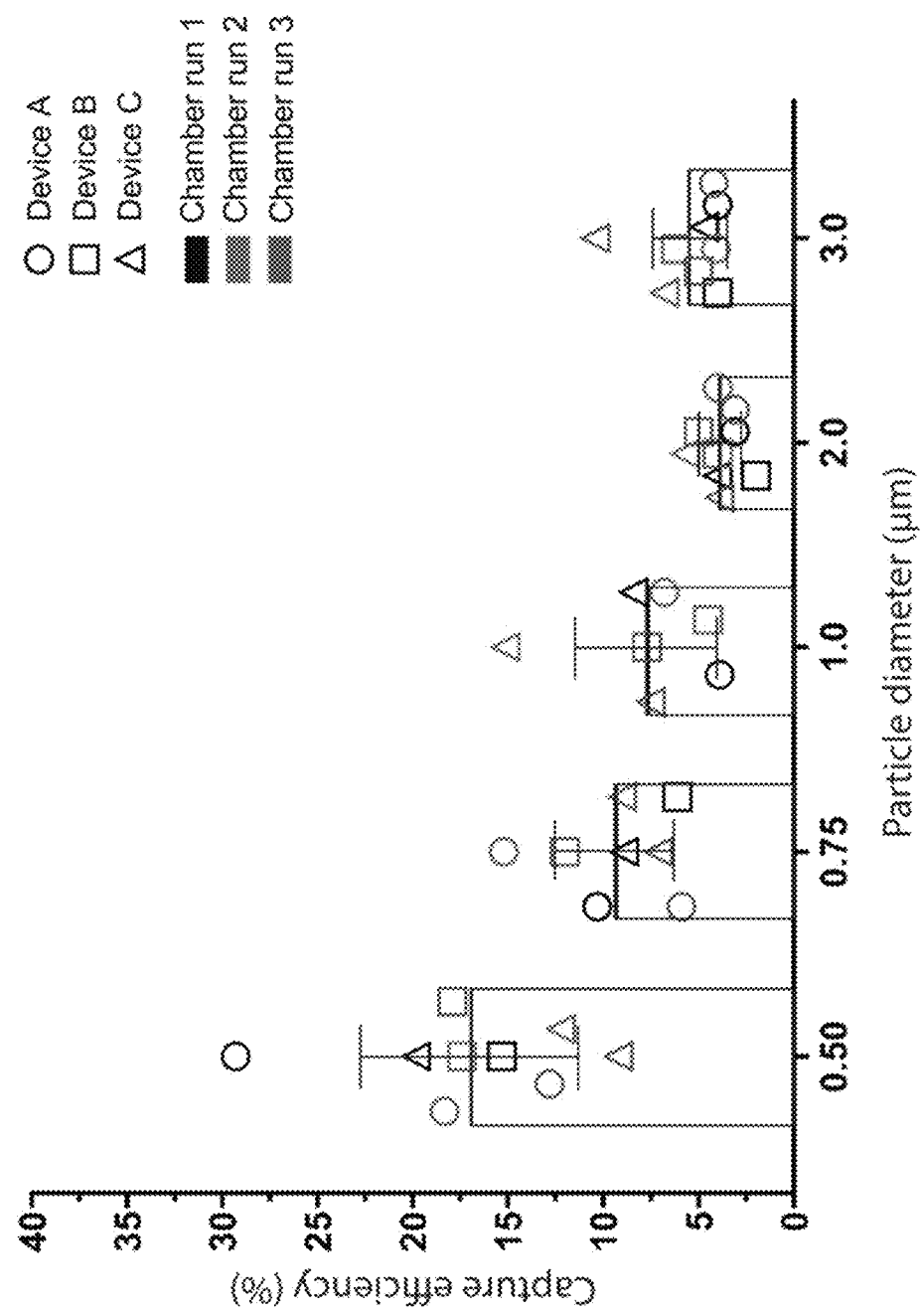
FIG. 9 illustrates the aerosol capture efficiency measured for the device for different particle diameters.

FIG. 9 illustrates the aerosol capture efficiency measured for the device (i.e., with the design utilizing 30 degree baffle angles and 6 total baffles) for different particle diameters. A testing chamber (0.56×0.52×0.42 m) was used to determine the capture efficiency of the device using fluorescent polystyrene latex (PSL) particles (Fluoresbrite™ YG Microspheres, Polysciences Inc. of Warrington, PA); particle diameters tested include 0.5, 0.75, 1, 2, and 3 µm. The particles were diluted in deionized (DI) water and aerosolized using a VixOne Nebulizer (Westmed Inc. of Englewood, CO). In this experiment, each particle size had a dedicated nebulizer to prevent contamination of other particles sizes. An aerodynamic particle sizer (APS 3321, TSI Inc. of Shoreview, MN) was used to monitor the particle size aerosolized and particle concentration during experimental runs. Particle concentration varied by size. Table 1 (below)

shows the particle concentration used in the test chamber for each particle size. Particle concentrations used at each side were varied to ensure adequate particles were aerosolized and available in the test chamber. During each 25-minute chamber rum, 2-3 mL of solution was nebulized. The concentration reported here was measured with an aerodynamic particle sizer (APS) attached to the chamber exhaust.

TABLE 1

| Particle Size (µm) | Concentration (particle/cm$^3$) |
|---|---|
| 0.50 | 4500-5500 |
| 0.75 | 10000-13000 |
| 1.0 | 4200-5800 |
| 2.0 | 1200-1500 |
| 3.0 | 1200-1500 |

Three open-face aerosol reference filter holders (EMD Millipore, Model #XX5004710 from Merck Group of Burlington, MA) with 0.2 µm PTFE Omnipore membrane filters (Millipore Sigma, product #JGWP04700, from Merck Group) were co-located with the air sampling devices in the chamber to collect particles; filter membranes were collected for analysis. Flow rates for reference filters placed in the chamber were calibrated using a mass flow meter (TSI Inc., Model #4140) to 3.15 slpm (half the flow rate of the device due to limitations in the flow controller). A humidity monitor (Extech Instruments of Nashua, NH, Model #SD700; AcuRite of Lake Geneva, WI, Model #01083M) and a dry airline in the chamber was used to keep the humidity between 60-70%. An interchangeable particle capture region was pre-wetted before placing the fully assembled devices into the chamber; the sampling region in the device was replaced between chamber runs. Devices and reference filters captured particles for 25 minutes followed by a 3-minute chamber purge before devices being removed from the chamber. A 1 oz. polystyrene cup collected the sample (Uline of Pleasant Prairie, WI, product #S-14487) and was weighed (Pro Pocket Scale TOP500 from Smart Weigh) before and after chamber runs. Sampling regions were rinsed down with approximately 5 mL of DI water after chamber runs. All samples were diluted to 25 g (25 mL) using DI water which matched the volume of water used for the reference filters. Reference filters were carefully placed in 50 mL polypropylene centrifuge tubes (Thermo Fisher Scientific of Waltham, MA, product #339652) with 25 mL DI water.

Fluorescence Measurements

Figure 10:
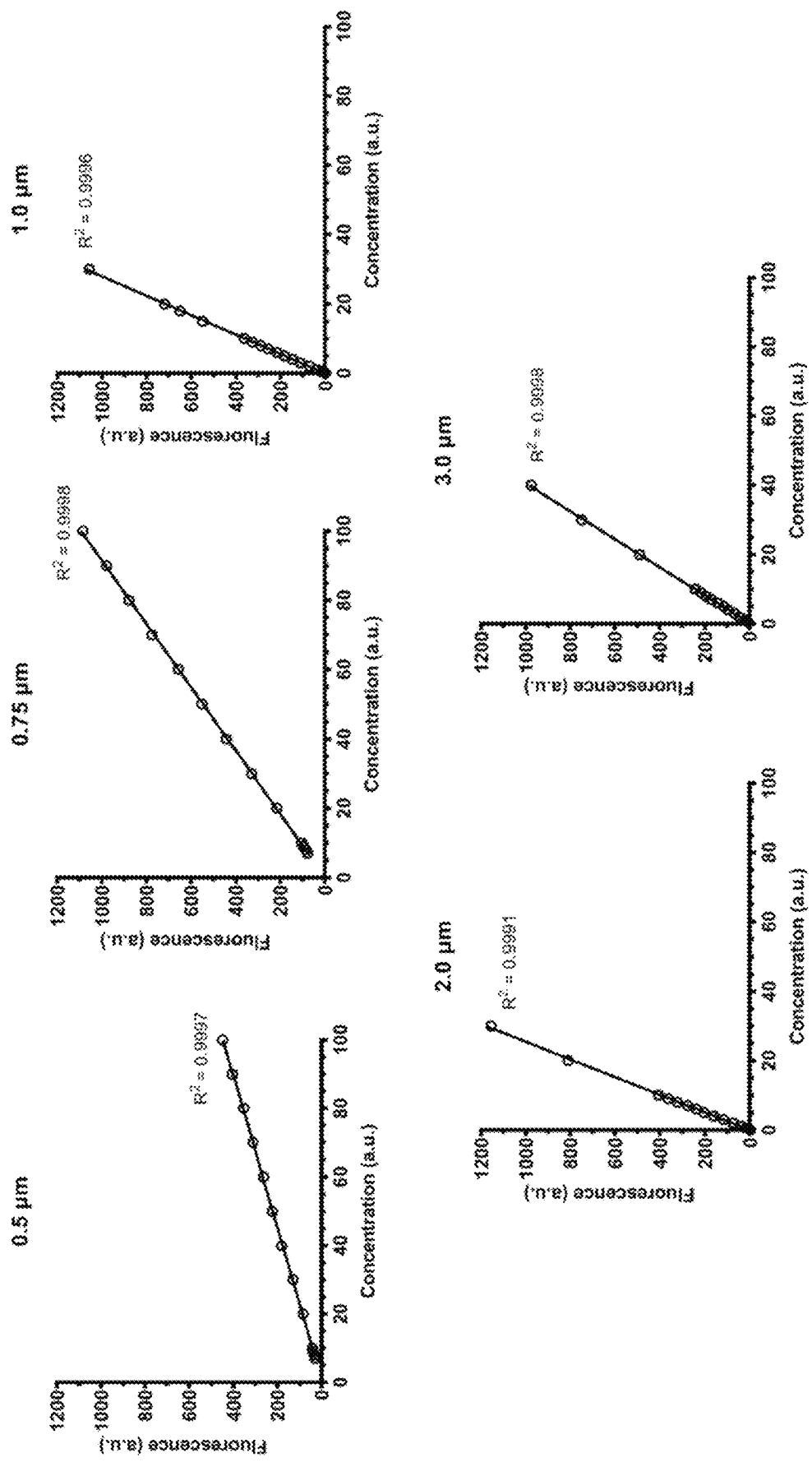
FIG. 10 illustrates fluorescence measurements from dilutions of a stock solution of different sizes of particle, which correspond to the sizes of particle used for capture in the device.

FIG. 10 illustrates fluorescence measurements from samples with different target sizes. Capture efficiency was calculated as 100×(fluorescence of samples from our device/fluorescence of co-located reference filter). Fluorescence measurements were performed using a fluorometer set to a gain of 200 (Sequoia-Turner of Santa Clara, CA; Model 450). Sample cups and centrifuge tubes containing the reference filters were vortexed (Vortex-Genie 2, Scientific Industries, Inc. of Bohemia, NY) for at least 8 minutes at 1800 RPM and remained vortexing until analysis. A 5 mL aliquot of the sample was transferred to a 12×75 mm borosilicate disposable culture tube (Fisherbrand, Cat No. 14-961-26; Fisher Scientific) and discarded to rinse the tube of any previous sample. The sample was re-aliquoted into the test tube and measured then discarded, for a total of three measurements. Between each aliquot, the pipette was used to resuspend the particles in the sample cup once before measurement. A new glass test tube was used for each particle size on any given day. Blank measurements were always taken when switching to a new glass test tube. Calibration curves for each particle size are shown in FIG. 10. Blank measurements were subtracted from sample and reference fluorescent values prior to additional calculations and statistical analyses.

MS2 Aerosolization and Analysis

FIG. 11 illustrates images of cultured samples from the device after capturing a bioaerosol and cultured samples from the device after being exposed to a negative control. A testing chamber operating similarly to the one described previously was used to determine if our device was capable of capturing a bioaerosol (bacteriophage MS2; ATCC #15597-B1. A 1-mL MS2 solution (1.9×1011 PFU) was aerosolized (VixOne Nebulizer) in a closed chamber. An aerodynamic particle sizer (APS 3321, TSI Inc.) was used to monitor the particle concentration during experimental runs. A 25-minute sampling period followed by a 5 min purge was used. Device samples collected in the 1-oz. polystyrene cups were collected without further dilution. A double agar layer plaque assay was performed to assess MS2 viability in a bacterial host (*Escherichia coli*). Briefly, Tryptic Soy Agar (TSA) (BD Difco #236950 from Becton Dickinson of Franklin Lakes, NJ) was prepared following manufacturer's directions, added to petri dishes (Fisherbrand 100×15 mm #FB0875712 from Fisher Scientific International of Hampton, NH), and allowed to cool at room temperature. A ten-fold serial dilution was performed using 1×PBS for all samples. 100 µL of diluted sample and 100 µL of an *E. coli* Famp (ATCC #700891 from ATCC of Manassas, VA) suspension were added to 7 mL of top agar (0.5% (w/v) NaCl (Fisher Scientific #S271-500) and 0.7% (w/v) Bacto Agar (BD #214010)) in a borosilicate glass tube (Fisherbrand #14-961-27) after which the solution was mixed by rolling tube between hands and subsequently poured onto prepared TSA plates; top agar was cooled before plates were inverted and incubated overnight at 37° C. Plaques were counted the following day. The assay was performed in duplicate for all sample dilutions, including undiluted samples. Additionally, a negative control (only *E. coli*) and PBS control (PBS added in place of sample) were also obtained.

Data Analysis

Data and statistical analyses were performed using Prism v9.0 software (GraphPad Software Inc. of San Diego, CA).

Results and Discussion

Design Considerations

The portable air-sampling device, approximately the size of a small teapot, can be placed in many environments (homes, schools, hospitals, playgrounds, farms) for aerosol capture. Major considerations for the device included how to keep the device within a comfortable size to place on a desk, battery-powered to avoid the need of a power outlet, and simple to operate in a variety of environments. An additional consideration included maintaining the captured bioaerosols in liquid to ensure their viability and compatibility with rapid downstream analysis, a point of interest for future studies. While the demonstration in this experimental example focuses on manipulating airflow for microdroplet retention, model inert particles were also used to demonstrate the capability of the air-sampling device with bioaerosol applications. An air-sampling device based on aerosolized microdroplets has the potential to capture a wide range of aerosols (Mussatti et al., in EPA Air Pollution Control Cost Manual 6ed. 2002) and is amenable for use with a variety of liquid capture solutions (e.g., water, surfactant, media, and solvents). Liquid droplets were incorporated into the portable sampling device.

Figure 12:
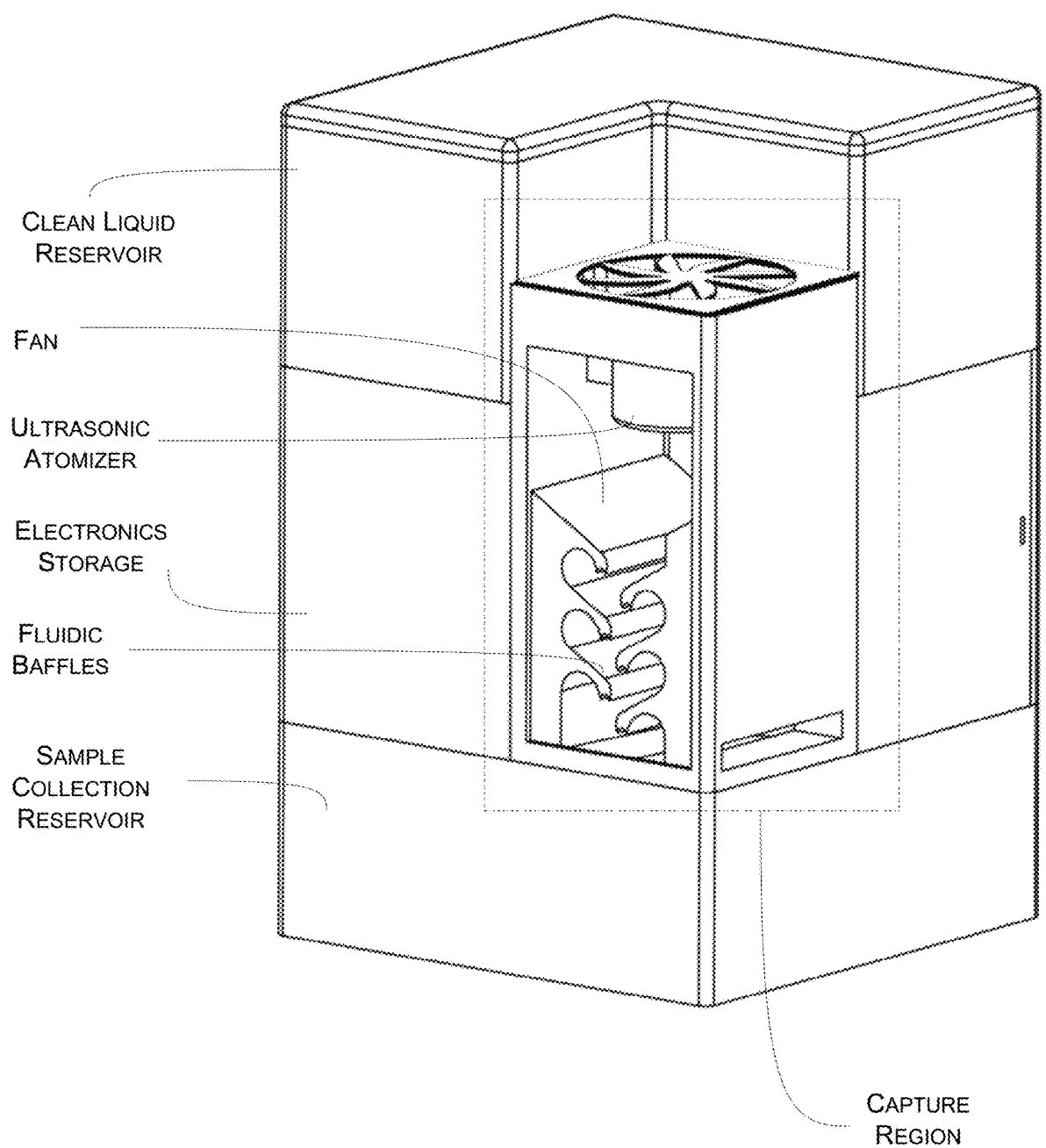
FIG. 12 illustrates a diagram of one of the devices used in this experimental example.

FIG. 12 illustrates a diagram of one of the devices used in this experimental example. The air-sampling device includes of a small fan, an ultrasonic atomizer (droplet generator), and a 3D printed body. The fan draws in air from the environment, and an ultrasonic atomizer generates 4 µm liquid droplets which move in the same direction as the air flow. The liquid droplets capture aerosols that enter through the fan. In the device, the microdroplets have an initial velocity that is independent of the air flow generated by the fan. Although the fan flow rate is tunable by adjusting the voltage delivered to the fan, the aerosol experiments and simulations in this manuscript were conducted with a flowrate of 6.3 standard liters per minute (SLPM). Additionally, the initial velocity of the microdroplets is constant due to the designed frequency of the ultrasonic atomizer. The microdroplets and aerosols are carried in a non-linear path by the airflow generated by the fan and coalesce on fluidic baffles. The baffles contain open mesofluidic channels that guide the coalesced droplets to a collection reservoir at the bottom of the device. The clean liquid reservoir and sample collection reservoir were designed to each hold up to 200 mL of fluid for an operation time of 1 hour but the device is amenable to other volumes and operation times. Electronic components (fan and ultrasonic atomizer) were made compatible for battery operation to improve overall portability, but the battery also limits the operation time. Due to the low pressure drop of the flow path, the device can be operated using low-cost fans. For example, unlike widely used air-sampling devices today (e.g., Anderson cascade impactors, Burkard personal volumetric air sampler, Coriolis biological air sample, cyclones, and impingers), the device can operate without use of a pump.

Flow Guiding Baffles and Open Fluidic Channels

The capture region of the air-sampling device was designed to increase interactions and mixing of microdroplets and aerosols. In traditional wet scrubbers, droplet paths are linear, such that the droplet residence time is dependent on the length (e.g., height) of the device. To achieve reasonable capture efficiency, traditional wet scrubbers are therefore relatively large.

In contrast, the device of the experimental example has a relatively small size and maintains portability. The device included fluidic baffles that generate recirculation zones with longer residence time than the main airflow (see FIG. 2A). Air and droplets follow the flow paths and populate regions under each baffle due to a low Stokes Number (<0.03). Internal geometry of each flow channel included a series of horizontal open channels underneath the baffles, connected by a vertical open channel along the back wall (see FIG. 1). The constriction bends to form an impinging jet on the upper surface of each baffle (see FIGS. 2A and 2B). The angled impinging jets create stagnation regions (see FIG. 2C).

In the device, the stagnation regions occur at the edge of the baffles. A portion of the jet follows the curve of the baffle (creating recirculation zones), and the remaining jet joins the bulk flow in the constriction (see FIG. 2A). Microdroplet growth and transition to liquid effluent is likely due to two complementary mechanisms: (i) microdroplet coalescence and (ii) heterogeneous growth in a supersaturated environment. These are similar to the growth of combustion-generated particles, where recirculating leads to the formation of large super-aggregates. Chakrabarty at al., Applied Physics Letters 2014, 104(24), 243103; Davis at al., Fuel (Lond) 2019, 245, 447-57. It is challenging to model these processes, however, the highest probability of droplet coalescence and heterogeneous growth occurs in regions with long residence time and high droplet concentration. In the geometry of this device, these conditions are present at the stagnation regions and in the recirculation zone. Once larger droplets are formed, they either settle on the surface due to gravity or via inertial impaction associated with the impinging jet. On the surface, these larger droplets migrate to the edge under the aerodynamic load acting on the droplet (Cleaver et al., Journal of Colloid and Interface Science 1973, 44(3), 464-74; O'Neill, Chemical Engineering Science 1968, 23(11), 1293-98; Fillingham et al., Journal of Aerosol Science 2019, 128, 89-98; Fillingham et al., Powder Technology 2021, 377, 958-65) or by gravity and are collected in the horizontal open mesofluidic channel embedded in the edge of the baffle (see FIG. 2C). The horizontal open channel guides the aerosol-laden sample toward the back wall where it meets the vertical open channel; this vertical open channel connects all of the baffles and drains the sample into a collection reservoir (see FIG. 2D).

Computational Modeling of Airflow and Effects of Baffle Geometry

Computational modeling aimed to (1) better visualize formation of recirculation zones and air flow around the baffles and (2) improve droplet retention within the device (reducing droplet loss through the outlet) was also performed. The microdroplet-aerosol collisions were increased by incorporating baffles thus promoting the formation of recirculation zones. The multiple impinging jet flow pattern enables inertial impaction of droplets onto surfaces for capture. Using Computational Fluid Dynamics (CFD) COMSOL Multiphysics™ (from COMSOL Inc. of Burlington, MA), a parameter space optimization of the features in the capture region was performed, specifically looking at how the features affected airflow (FIGS. 6A and 7A), and ultimately improved droplet retention (FIGS. 6B and 7B). A mean air velocity field and pressure at a steady-state was computed. A 2D cross-section was modeled to reduce computational load. Blazek in Computational Fluid Dynamics: Principles and Applications, 3rd Ed. 2015, pp 1-407. Recognizing the challenges associated with modeling and validation of aerosol-laden flow (Petersen et al., Aerosol Science and Technology 2019, 53(6), 712-27), CFD was used as a comparative tool to inform device design iterations and not as an absolute or quantitative method. Briefly, the following boundary conditions were used: a fully developed flow rate profile was used for the inlet with a zero-pressure outlet; all other walls were modeled with a no-slip boundary condition.

Experimentally, droplets were observed accumulating on internal surfaces in the device, coalescing to form larger droplets, and being shuttled away by the mesofluidic channels to the collection area. Modeling the mean airflow in the device enabled extraction of details such as the direction and pattern of the airflow; the flow within the device is laminar with a calculated Reynolds Number of less than 1200. To understand the effect of baffle geometry on recirculation zone formation and air flow, the quantity and angle of the baffles was varied (see FIGS. 7A to 8B). More recirculation zones were created with each additional set of baffles (see FIG. 7A). The baffles also increased the probability of droplet capture due to (i) increased surface to volume ratio and (ii) greater number of impinging jet regions where the high velocity interacts with the wall. This is supported by experimental droplet retention results shown in FIG. 7B. Further, each extra set of baffles constricts the main airflow resulting in an increased velocity of the impinging jet, allowing for more effective liquid transport from the stagnation regions to the mesofluidic channel. The horizontal space between the baffles controls the airflow constriction. However, if the horizontal space is too small, it can also cause backflow in the device. The number of stagnation regions increases with the quantity of baffles, providing more areas of high coalescence for droplets (see FIG. 7A).

'FIGS. 13A to 13C illustrate example pressure drops simulated in various example designs of the device. FIG. 13A illustrates pressure drops modeled with different device designs having different numbers of baffles. FIG. 13B illustrate example pressure drops modeled with different device designs having different baffle angles. FIG. 13C illustrates a pressure drop at a stagnation region in a device with six baffles and baffles angled at 30 degrees. As shown by FIGS. 13A to 13C, the pressure above the top baffles increases with each additional set of baffles and decreases as the angle increases. Based on these observations, the six-baffle design was used in aerosol capture efficiency studies used to produce FIG. 9.

Microdroplet Retention Efficiency

The microdroplets generated to capture aerosols in air were captured by the device to perform analyses. The microdroplet capture process can be challenging due to the high rate of air flow through the device while limiting constriction of that air flow. As the ultrasonic atomizer generates microdroplets and the fan draws aerosols into the device, an airflow exhaust was designed to prevent flow exiting through the inlet in the case of high back pressure. An unobstructed geometry can promote microdroplets flowing through the device without being captured. to the design of this device maximizes the microdroplet retention while keeping an outlet to prevent backflow. The pressure drop associated with the impinging jet at stagnation regions helps coalesce the droplets on the baffles, however, it should not be high enough to cause backflow. A mesh filter to increase microdroplet retention was excluded from this device because recovering bioaerosols from filters can be damaging. Lindsley et al. in NIOSH Manual of Analytical Methods, 5th Ed. ed. 2017, pp 2-115. Additionally, droplets clog the small apertures in mesh surfaces which can block airflow.

Through various design iterations, the percentage of liquid retained was measured by weighing the ultrasonic atomizer filled with water and the aerosol capture region of the device before and after operating the ultrasonic atomizer. Microdroplet retention increased with numbers of baffles with an 81% droplet retention in the six-baffle design (FIG. 9B). The effect of the angle of the baffle on microdroplet retention was also assessed. There was an increase in microdroplet retention between 0° and 15° baffle angle followed by a decrease between 15° and 30° baffle angle. A 15° baffle angle had the largest microdroplet retention of 83%, while 0° and 30° baffle angle had a 73% and 81% microdroplet retention, respectively (FIG. 9B). Since there was not a statistically significant difference in microdroplet retention between a 15° and 30° baffle angle, the 30° baffle angle was selected due to the reduced pressure near the fan inlet, which is favorable in reducing backflow (See FIG. 13A).

Aerosol Capture Efficiency

An aerosol chamber (described in He & Novosselov, Aerosol Science and Technology 2017, 51(9), 1016-26) was used to test the six-baffle, 30° baffle angle portable device for aerosol capture efficiency. Briefly, monodispersed fluorescent polystyrene latex spheres of varying sizes (0.5, 0.75, 1, 2, and 3 μm) were aerosolized in separate experiments using a nebulizer (summarized in Table 1). Two fans placed in opposite corners of the chamber were used to provide well-mixed conditions in the chamber. Three devices (each with the six, 30 degree baffle design), co-located with reference filters, were tested in the chamber at the same time for 25-minutes.

Figure 14:
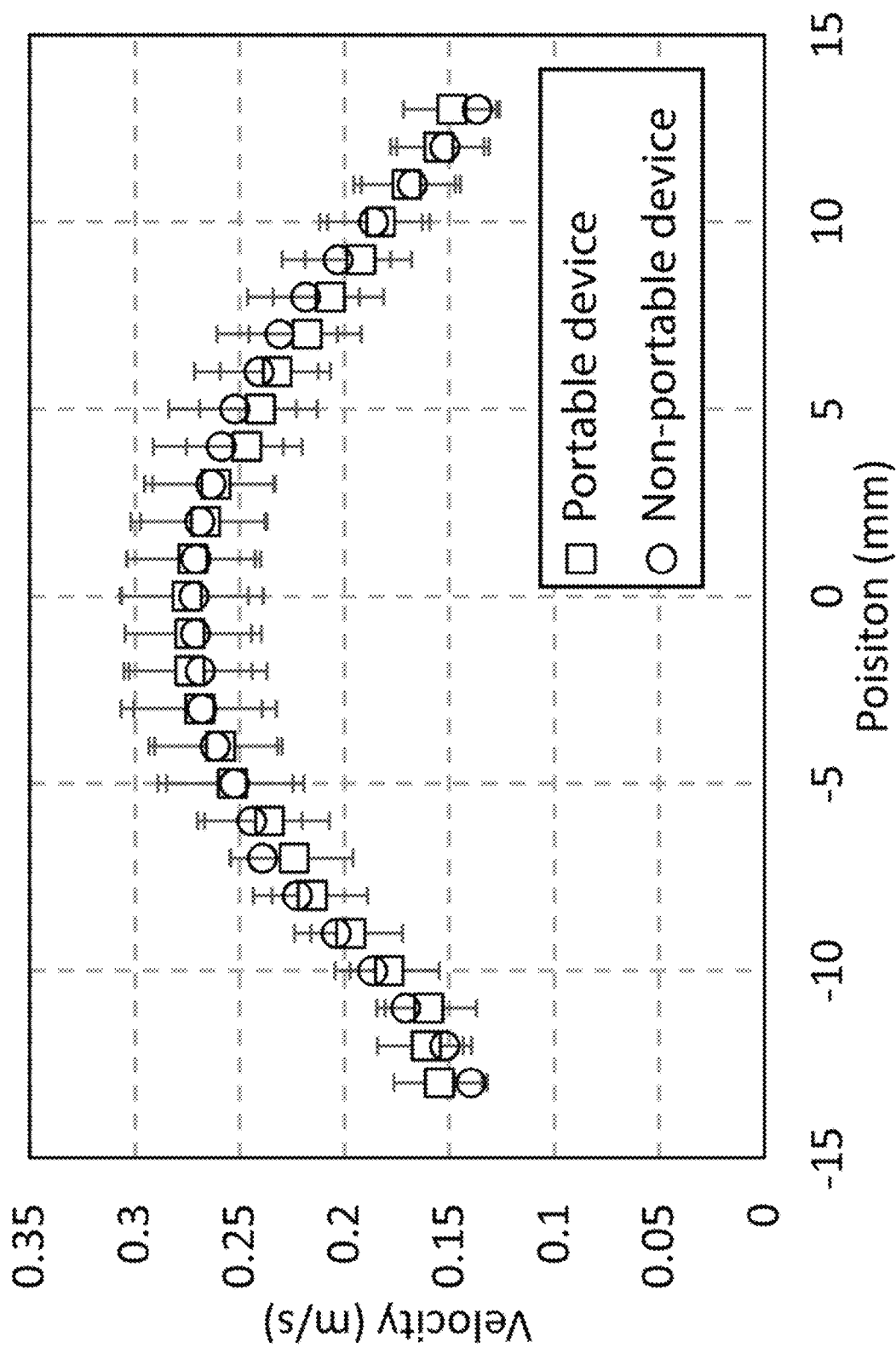
FIG. 14 illustrates an example of a graph comparing the velocity of air flow in a portable device versus a non-portable device along different positions across the diameter of the outlet of the device.

FIG. 14 illustrates an example of a graph comparing the velocity of droplets in a portable device (e.g., a version of the device powered by a 9 V battery) versus a non-portable device (e.g., a version of the device with a power supply that was plugged into an outlet) along different positions within the interior spaces of the devices. A reference filter flow rate was obtained by tuning a reference filter to match the flow rate of the portable and non-portable device. That is, the reference filter flow rate matched the measured flow rate of the device. 25 mL of DI water was used to elute the particles from the filter and additional DI water was added to the device sample until the volume was also 25 mL. The fluorescence of the liquid sample was measured and a ratio to determine aerosol collection efficiency was used. Particle sizes were selected based on model particles commonly used in bioaerosol research. The use of model polystyrene latex spheres for device testing was to avoid unnecessary exposure to bioaerosols. Table 2 (below) shows the diameters of different aerosolized biological particles of interest. To avoid unnecessary exposure to known biological pathogens in this experimental example, monodispersed fluorescent polystyrene latex spheres were tested as a proxy to these biological particles. The sizes of the polystyrene latex spheres were selected based on relevant bioaerosols known to adversely affect human health.

TABLE 2

| Diameter of inert particle proxy (μm) | Relevant bioaerosol | Diameter of relevant bioaerosol (μm) | Examples of human health impact |
| --- | --- | --- | --- |
| 0.5 | SARS-CoV-2 | 0.25-0.5 | COVID-19, respiratory complications |
| 0.75 | Staphylococcus aureus | 0.5-1.0 | Sepsis, pneumonia, infections |
| 1.0 | Viral particle + respiratory droplet | ≤1.0 | Flu, common cold |
| 2.0 | Aspergillus fumigatus | 2-3.5 | Pulmonary aspergillosis, allergic asthma |
| 3.0 | Mycobacterium tuberculosis | 2-4 | Tuberculosis |

It is important to note that 100% capture efficiency was not deemed necessary for analysis, because post-capture amplification steps (such as culture and PCR) can be employed for detection of bioaerosols and other biological targets. The highest efficiency observed in the device design of this example was 17.5% with 0.5 μm particles and the lowest efficiency was 4.5% with 2.0 μm particles (FIG. 9).

Figure 15A:
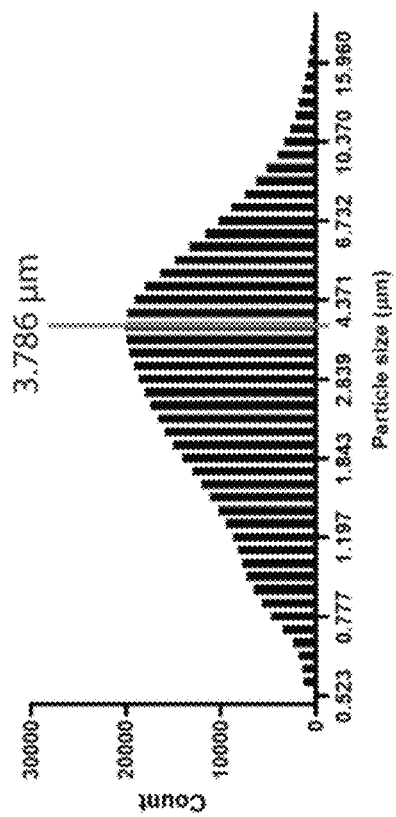
FIGS. 15A to 15C respectively illustrate the droplet size distribution of the droplet generator in the three instances of a device that was tested.
Figure 15B:
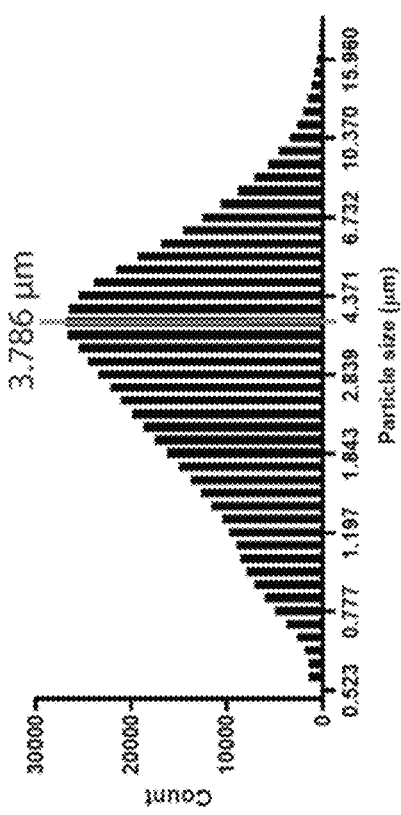
Figure 15C:
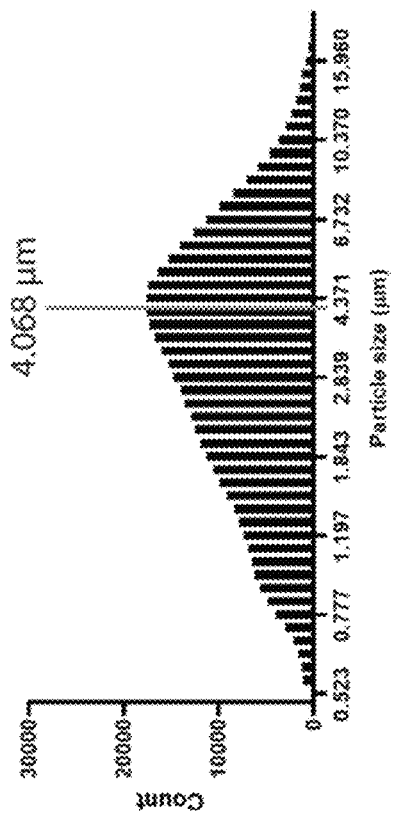

FIGS. 15A to 15C respectively illustrate the aerosol capture efficiency of the three devices tested. Differences in aerosol capture efficiency were observed between the three device samples tested, likely due to heterogeneity in the microdroplets produced by the ultrasonic mist generators and inherent differences in the 3D printing of the devices. The reproducibility across devices could be improved with more accurate fabrication methods. Importantly, variability in capture efficiency was also observed in reference filters used likely due to the manual control of the flow rate and particle nebulization. Table 3 (below) shows the relative standard deviation (RSD) of reference filters and devices across the three experimental test chamber runs. While variability was observed in the devices, variability was also observed in the reference filters, which could be due do the manual control of the flow rate and particle nebulization.

TABLE 3

|       | Device Avg. (a.u.) | Device RSD (%) | Reference Avg (a.u.) | Reference RSD (%) |
|-------|--------------------|----------------|----------------------|-------------------|
| 0.5 μm particles |  |  |  |  |
| Run 1 | 104.2 | 23.9 | 495.5 | 8.8 |
| Run 2 | 102.5 | 9.2  | 654.4 | 14.8 |
| Run 3 | 83.9  | 13.9 | 662.3 | 23.4 |
| 0.75 μm particles |  |  |  |  |
| Run 1 | 164.7 | 25.8 | 1954.2 | 5.4 |
| Run 2 | 132.7 | 17.8 | 1138.3 | 19.0 |
| Run 3 | 107.0 | 19.8 | 1335.7 | 16.8 |
| 1.0 μm particles |  |  |  |  |
| Run 1 | 68.3  | 56.6 | 1096.8 | 5.1 |
| Run 2 | 113.0 | 77.3 | 1206.0 | 14.8 |
| Run 3 | 66.7  | 17.0 | 880.2  | 19.4 |
| 2.0 μm particles |  |  |  |  |
| Run 1 | 38.1  | 38.7 | 1237.1 | 7.6 |
| Run 2 | 55.3  | 16.2 | 1224.3 | 4.6 |
| Run 3 | 54.6  | 18.7 | 1366.9 | 4.9 |
| 3.0 μm particles |  |  |  |  |
| Run 1 | 29.0  | 17.4 | 682.4 | 10.1 |
| Run 2 | 42.2  | 26.1 | 738.6 | 1.6 |
| Run 3 | 48.3  | 51.7 | 738.3 | 0.7 |

Based on prior literature for other capture devices (Gordon et al., Microbiome 2015, 3(1), 79; An et al., Indoor Air 2004, 14(6), 385-93; Mischler et al., Journal of Occupational and Environmental Hygiene 2013, 10(12), 685-93; Walls et al., Aerosol Science and Technology 2016, 50(8), 802-11), aerosol capture efficiency often varies with each particle size tested.

Bioaerosol Capture

To demonstrate a potential application of the device in capturing bioaerosols while maintaining viability, a bacteriophage MS2 solution was aerosolized in a chamber with the device and the collected liquid from the device was analyzed. MS2 is a virus that infects *E. coli* and is commonly used as a surrogate viral particle in aerosol studies for safety concerns. Machado et al., Arch Microbiol 2021, 1-9. Briefly, an MS2 solution was nebulized in a closed aerosol chamber containing a device for a 25-minute sampling period. As a control, a chamber run was performed where no MS2 was nebulized. A plaque assay was then performed with the liquid samples collected from our device to determine if MS2 was present and viable. The results from the control showed no MS2 (FIG. 11, left). In comparison, samples from the chamber runs where MS2 was nebulized show MS2 was captured by the device and able to infect *E. coli*, an indication that the MS2 remained viable (FIG. 11, right).

This experimental example provides battery-powered air-sampling device that uses microdroplets to capture aerosols for analysis. The high humidity environment generated within the device coupled with storage of the captured aerosols in a fluid through the duration of the sampling period has the potential to keep bioaerosols viable for downstream culture and analysis. In this case, high capture efficiency is not critical to the identification of the captured bioaerosol because the sample can be amplified via culture (or detection methods like PCR) after capture. Additionally, the results were obtained with off-the-shelf low-cost components that have not been fully optimized for the application. Therefore, it is possible that much higher efficiencies can be obtained after an optimization process. The bulk fluid also enables seamless integration with existing downstream analysis methods. To collect a sample from their environment, a user may fill the reservoir with an appropriate fluid, flip the power switch, and put a cap on the collection reservoir after sampling. They can then provide (e.g., mail) the sample to a lab for analysis.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be used for realizing implementations of the disclosure in diverse forms thereof.

As will be understood by one of ordinary skill in the art, each implementation disclosed herein can comprise, consist essentially of or consist of its particular stated element, step, or component. Thus, the terms "include" or "including" should be interpreted to recite: "comprise, consist of, or consist essentially of." The transition term "comprise" or "comprises" means has, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the implementation to the specified elements, steps, ingredients or components and to those that do not materially affect the implementation. As used herein, the term "based on" is equivalent to "based at least partly on," unless otherwise specified.

Unless otherwise indicated, all numbers expressing quantities, properties, conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e. denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

This disclosure describes "vertical" and "horizontal" directions. According to various implementations, a "vertical" direction may refer to a direction that is parallel to the direction of gravity. A "horizontal" direction may refer to a direction that crosses a vertical direction, such as a direction that is perpendicular to a vertical direction.

The terms "a," "an," "the" and similar referents used in the context of describing implementations (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate implementations of the disclosure and does not pose a limitation on the scope of the disclosure. No language in the specification should be construed as indicating any non-claimed element essential to the practice of implementations of the disclosure.

Groupings of alternative elements or implementations disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain implementations are described herein, including the best mode known to the inventors for carrying out implementations of the disclosure. Of course, variations on these described implementations will become apparent to those of ordinary skill in the art upon reading the foregoing description. The inventor expects skilled artisans to employ such variations as appropriate, and the inventors intend for implementations to be practiced otherwise than specifically described herein. Accordingly, the scope of this disclosure includes all modifications and equivalents of the subject matter recited in the claims appended hereto as permitted by applicable law. Moreover, any combination of the above-described elements in all possible variations thereof is encompassed by implementations of the disclosure unless otherwise indicated herein or otherwise clearly contradicted by context.

The invention claimed is:

1. A portable, nondesiccating sampling device, comprising a housing partially enclosing an interior space and comprising:
   at least one inlet connecting the interior space to an external environment;
   at least one outlet connecting the interior space to the external environment; and
   baffles extending into the interior space from opposite sidewalls, the baffles comprising:
   a first baffle having a curved lower surface that is concave; and
   a second baffle disposed below the first baffle, the second baffle having a curved upper surface that is convex;
   a droplet generator configured to generate droplets in the interior space;
   a flow generator configured to move air and a target from the external environment into the interior space through the at least one inlet and to move the air, the target, and the droplets through the interior space in an impinging jet that splits into recirculation zones when the impinging jet intersects the baffles, at least one of the recirculation zones being disposed between the first baffle and the second baffle, the droplets and target coalescing on surfaces of the baffles; and
   at least one channel configured to move the coalesced droplets and target from the surfaces of the baffles to a collection reservoir.

2. The sampling device of claim 1, wherein the curved upper surface of the second baffle is
   hydrophobic and comprises a flat portion and a curved portion, the curved portion being concave, and
   wherein the second baffle further comprises
   a lower surface that is concave.

3. The sampling device of claim 2, wherein the flat portion is disposed at an angle between 90 and 45 degrees with respect to a direction of gravity.

4. The sampling device of claim 2, wherein the at least one channel is an open channel disposed on an edge of the second baffle, the edge being disposed between the hydrophobic upper surface and the lower surface of the second baffle.

5. The sampling device of claim 1, wherein the droplet generator comprises an ultrasonic transducer, an electrospray, or a nozzle.

6. The sampling device of claim 1, wherein the droplets comprise at least one of water, oil, or a stabilization material.

7. The sampling device of claim 1, wherein the flow generator comprises a fan.

8. The sampling device of claim 1, wherein the target comprises a biological material with a width in a range of 0.1 microns (μm) to 1 mm.

9. The sampling device of claim 1, wherein a width of the droplets is in a range of 1 μm to 50 μm.

10. The sampling device of claim 1, further comprising: a third baffle extending from a first sidewall of the housing, wherein the second baffle extends from a second sidewall of the housing opposite the first sidewall, and wherein the second baffle at least partially extends between the first baffle and the third baffle.

11. A method, comprising:
    generating, by a flow generator, an impinging jet comprising a mixture of air, a target, and droplets;
    splitting the impinging jet into a recirculation zone by a first baffle extending from one side of a housing and having a curved lower surface that is concave and a second baffle that is below the first baffle, extending from the opposite side of the housing and having a curved upper surface that is convex;
    coalescing, by the first baffle and the second baffle, a mixture of the target and the droplets onto the upper surface of the second baffle;
    receiving, by at least one channel, the coalesced mixture; and
    transporting, by the at last one channel, the coalesced mixture to a collection reservoir.

12. The method of claim 11, further comprising:
    obtaining a sample from the collection reservoir;
    culturing the sample in a culture medium; and
    confirming a presence of the target based on the cultured sample.

13. The method of claim 11, further comprising:
generating, by a droplet generator, the droplets, the droplets comprising water and having widths in a range of 1 μm to 50 μm.

14. A device, comprising:
a housing partially enclosing an interior space and comprising a plurality of baffles extending into the interior space from opposite sidewalls in a vertically staggered pattern;

a flow generator configured to generate an impinging jet comprising a mixture of air, a target, and droplets in the interior space, the impinging jet being directed toward upper surfaces of the baffles, the upper surfaces of the baffles comprising curved portions that are convex; and at least one channel open to the interior space and configured to move a coalesced mixture of the droplets and the target to a collection reservoir.

15. The device of claim 14, wherein the upper surface further comprises a flat portion.

16. The device of claim 15, wherein the flat portion is disposed at an angle between 90 and 45 degrees with respect to a direction of gravity, and wherein the upper surface of the baffle is hydrophobic.

17. The device of claim 15, wherein an edge of the curved portion is an edge of the at least one channel, the at least one channel extending in a direction crossing a direction of gravity.

18. The device of claim 17, further comprising: an additional channel integrated with the housing and fluidly connecting the collection reservoir and the at least one channel.

19. The device of claim 14, further comprising:

a droplet generator configured to generate the droplets in the interior space of the housing, the droplets comprising water and having widths in a range of 1 μm to 5 mm.

20. The device of claim 14, wherein the target comprises a particle with a width in a range of 0.1 μm to 1 mm, the target comprising at least one of a biological material, volcanic ash, smoke, soot, cement dust, and saw dust.

* * * * *